US012627881B2

(12) United States Patent
Wang et al.

(10) Patent No.: US 12,627,881 B2
(45) Date of Patent: May 12, 2026

(54) SHOOTING METHOD AND ELECTRONIC DEVICE

(71) Applicant: HONOR DEVICE CO., LTD.,
Shenzhen (CN)

(72) Inventors: Ning Wang, Shenzhen (CN); Rongyue Xu, Shenzhen (CN); Zhiqi Li, Shenzhen (CN); Zhixiang Hao, Shenzhen (CN); Daiting Chen, Shenzhen (CN)

(73) Assignee: HONOR DEVICE CO., LTD.,
Shenzhen (CN)

( * ) Notice: Subject to any disclaimer, the term of this patent is extended or adjusted under 35 U.S.C. 154(b) by 253 days.

(21) Appl. No.: 18/691,192

(22) PCT Filed: Apr. 19, 2023

(86) PCT No.: PCT/CN2023/089350
§ 371 (c)(1),
(2) Date: Sep. 4, 2024

(87) PCT Pub. No.: WO2023/226634
PCT Pub. Date: Nov. 30, 2023

(65) Prior Publication Data
US 2024/0422424 A1     Dec. 19, 2024

(30) Foreign Application Priority Data

May 27, 2022    (CN) ........................ 202210594819.X
Jul. 22, 2022    (CN) ........................ 202210871133.0

(51) Int. Cl.
*H04N 23/63*     (2023.01)
*H04N 23/68*     (2023.01)

(52) U.S. Cl.
CPC ....... *H04N 23/632* (2023.01); *H04N 23/6811* (2023.01); *H04N 23/683* (2023.01); *H04N 23/685* (2023.01)

(58) Field of Classification Search
CPC .... H04N 23/61; H04N 23/611; H04N 23/632; H04N 23/68; H04N 23/6811; H04N 23/683; H04N 23/685
See application file for complete search history.

(56) References Cited

U.S. PATENT DOCUMENTS 8,373,772 B2    2/2013    Takahashi
11,245,855 B2    2/2022    Ma
(Continued)

FOREIGN PATENT DOCUMENTS

CN    102017603 A    4/2011
CN    108900790 A    11/2018
(Continued)

*Primary Examiner* — Daniel M Pasiewicz
(74) *Attorney, Agent, or Firm* — WOMBLE BOND DICKINSON (US) LLP

(57) ABSTRACT

This application provides a shooting method and an electronic device. The method includes: The electronic device enables a camera application; and after detecting a video recording operation, the electronic device displays a preview image on a recording interface and highlights a subject image of a target shot subject, where the preview image and the subject image are obtained through processing based on a raw image, the target shot subject is at a target position on the subject image, and a viewfinder range of the subject image is within a viewfinder range of the preview image. In this way, a user only needs to keep the target shot subject within the viewfinder range of the preview image, so that video recording can be performed without requiring real-time and precise adjustment of a position of the target shot subject.

17 Claims, 25 Drawing Sheets

(56)                    References Cited

U.S. PATENT DOCUMENTS

| | | | |
|---|---|---|---|
| 11,765,463 | B2 | 9/2023 | Li et al. |
| 11,962,891 | B2 | 4/2024 | Su et al. |
| 2011/0032387 | A1 | 2/2011 | Takahashi |
| 2016/0212358 | A1 | 7/2016 | Shikata |
| 2017/0094184 | A1 | 3/2017 | Gao et al. |
| 2017/0277281 | A1 | 9/2017 | Seol et al. |
| 2021/0365707 | A1 * | 11/2021 | Mao ...................... H04N 23/80 |
| 2022/0270343 | A1 | 8/2022 | Wu et al. |

FOREIGN PATENT DOCUMENTS

| | | | |
|---|---|---|---|
| CN | 109151439 | A | 1/2019 |
| CN | 110072070 | A | 7/2019 |
| CN | 110896451 | A | 3/2020 |
| CN | 111010590 | A | 4/2020 |
| CN | 111083557 | A | 4/2020 |
| CN | 112261218 | A | 1/2021 |
| CN | 112446255 | A | 3/2021 |
| CN | 112954220 | A | 6/2021 |
| CN | 113766129 | A | 12/2021 |
| CN | 114430457 | A | 5/2022 |
| CN | 114598819 | A | 6/2022 |
| WO | 2021227693 | A1 | 11/2021 |

* cited by examiner

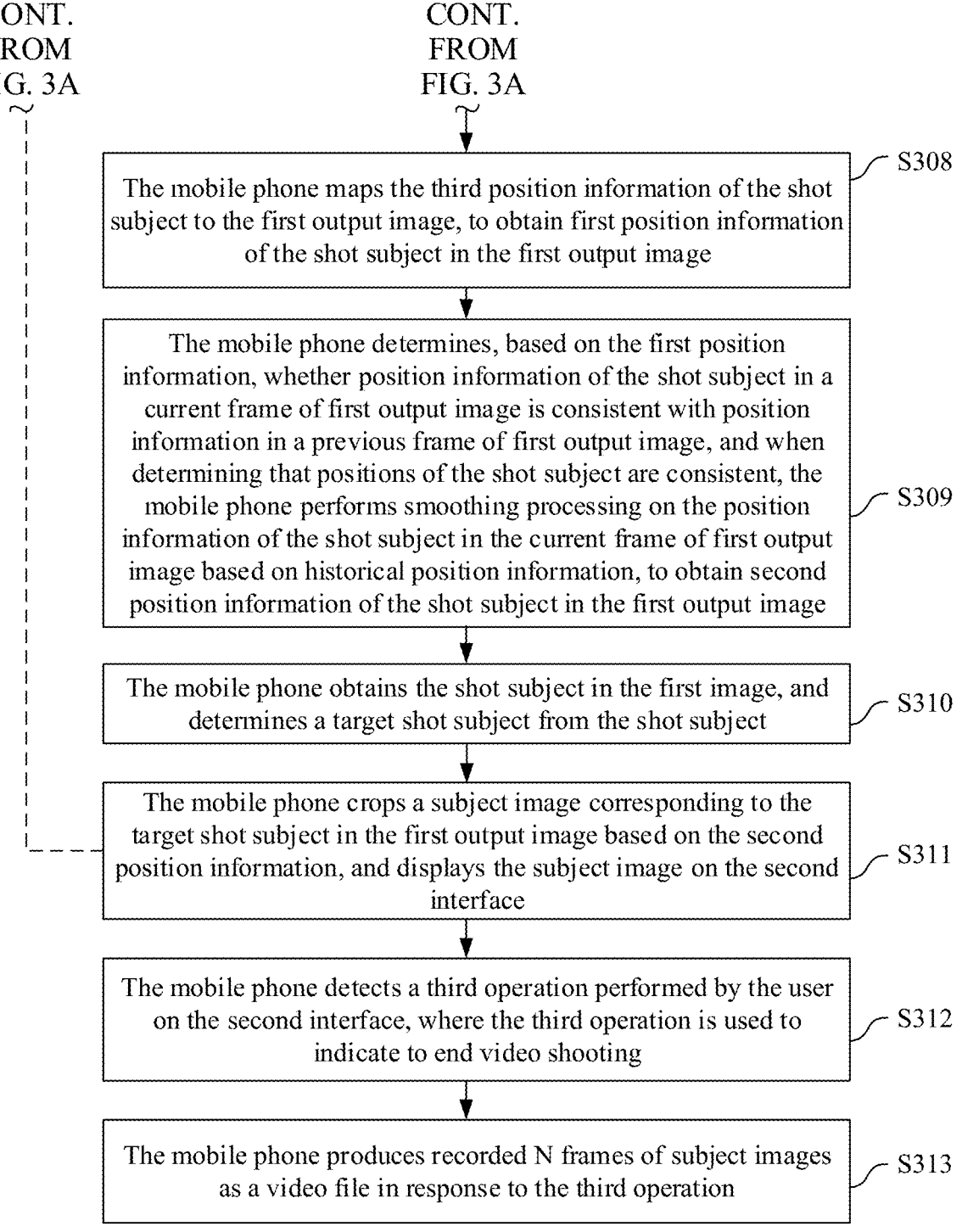

CONT.
FROM
FIG. 3A

CONT.
FROM
FIG. 3A

The mobile phone maps the third position information of the shot subject to the first output image, to obtain first position information of the shot subject in the first output image — S308

The mobile phone determines, based on the first position information, whether position information of the shot subject in a current frame of first output image is consistent with position information in a previous frame of first output image, and when determining that positions of the shot subject are consistent, the mobile phone performs smoothing processing on the position information of the shot subject in the current frame of first output image based on historical position information, to obtain second position information of the shot subject in the first output image — S309

The mobile phone obtains the shot subject in the first image, and determines a target shot subject from the shot subject — S310

The mobile phone crops a subject image corresponding to the target shot subject in the first output image based on the second position information, and displays the subject image on the second interface — S311

The mobile phone detects a third operation performed by the user on the second interface, where the third operation is used to indicate to end video shooting — S312

The mobile phone produces recorded N frames of subject images as a video file in response to the third operation — S313

FIG. 3B

Subject image

First image

Subject image

First image

First image

Subject image

A finger touches brackets at the head of a "younger brother"

TO FIG. 8C

First image

NIGHT PORTRAIT PHOTO VIDEO PRO APERTURE MORE

A finger touches brackets at the head of a "father"

TO FIG. 8B

First image

Subject image a — · — · Movement trajectory of a shot subject b — — — Movement trajectory of a camera c ———— Position of a shot subject in an original video d —— — Processed position of the shot subject e ·········· Position of the shot subject on which no image
              stabilization processing is performed

SHOOTING METHOD AND ELECTRONIC DEVICE

CROSS-REFERENCE TO RELATED APPLICATIONS

This application is a national stage of International Application No. PCT/CN2023/089350, filed on Apr. 19, 2023, which claims priority to Chinese Patent Application No. 202210594819.X, filed on May 27, 2022 and Chinese Patent Application No. 202210871133.0, filed Jul. 22, 2022, all of which are incorporated herein by reference in their entireties.

TECHNICAL FIELD

This application relates to the field of image processing technologies, and in particular, to a shooting method and an electronic device.

BACKGROUND

When recording a video or a video log (video log, vlog), a user usually pays more attention to a shot subject, and expects the shot subject is always at an optimal visual position (for example, a center of an image or a position of a golden section ratio). However, when the shot subject moves, a position of the shot subject changes, and an effect expected by the user that the shot subject is always at the optimal visual position cannot be implemented in a recorded video or vlog. Consequently, a presentation effect of the video or vlog is poor, affecting shooting and viewing experience of the user.

SUMMARY

This application provides a shooting method and an electronic device, to track a shot subject in a video, so that the shot subject is always at a target position such as an optimal visual position, to highlight the shot subject and shot content.

According to a first aspect, this application provides a shooting method, and the method may be applied to an electronic device. The electronic device includes a camera, and the camera is configured to collect a raw image. In the method, the electronic device enables a camera application. After detecting a video recording operation, the electronic device displays a preview image on a recording interface and highlights a subject image of a target shot subject, where the preview image and the subject image are obtained through processing based on the raw image, the target shot subject is at a target position on the subject image, and a viewfinder range of the subject image is within a viewfinder range of the preview image.

In this application, the electronic device displays both the preview image and the subject image on the recording interface. The preview image is an image with a relatively large viewfinder range that is actually collected by the camera, and therefore, picture content is richer. The viewfinder range of the subject image is within the viewfinder range of the preview image, that is, the subject image is an image with a relatively small viewfinder range. In this case, the subject image displays some picture content in the preview image. In this way, the target shot subject and shot content related to the target shot subject can be highlighted by using the subject image.

The subject image may be used to generate a static picture, or may be used to generate a video file. The target shot subject is at an optimal visual position in the static picture. In this case, composition of a shot image is more beautiful, and the target shot subject can be highlighted, presenting an optimal visual display effect. The target shot subject always remains at the target position in the video file. In this way, a user only needs to keep the target shot subject within the viewfinder range of the preview image, so that video recording can be performed without requiring real-time and precise adjustment of a position of the target shot subject. Therefore, a shooting difficulty is reduced, and shooting experience of the user is improved.

With reference to the first aspect, in a possible design manner, in a moving process of the target shot subject, the target shot subject remains at the target position on the subject image.

In this design manner, the user does not need to perform precise adjustment, and when the target shot subject moves, the target shot subject is always located at the optimal visual position and is highlighted. Therefore, a shooting difficulty is reduced, and shooting experience of the user is improved.

With reference to the first aspect, in a possible design manner, in the moving process of the target shot subject, smoothness of a background change of the target shot subject in the subject image is greater than smoothness of a background change of the target shot subject in the preview image.

In this design manner, smoothness of a background in the subject image is greater, which means that background transition is smoother. Then, in comparison with the preview image, the background in the subject image other than the target shot subject does not sharply change when there is a sudden change at a center point of the target shot subject due to movement of the target shot subject, in particular, violent movement. In this way, ghosting is not prone to occur on the background, and the background is clearer. In addition, a background change span of adjacent frames of subject images is small, and jumping and flashing in a picture in a recorded video due to a sharp background change can be better avoided. Therefore, smoothness of the subject image is greater, and a visual effect presented by the subject image is better.

With reference to the first aspect, in a possible design manner, there is at least one target shot subject, and there is at least one subject image. One target shot subject corresponds to one subject image, or one target shot subject corresponds to a plurality of subject images, and the subject image is located outside an area of the preview image or partially overlaps the area of the preview image.

In this design manner, a quantity of subject images displayed on the recording interface and a quantity of target shot subjects highlighted in the subject image are not limited. In a video recording process, adjustment may be performed based on a shooting objective and a composition requirement, to meet diversified shooting requirements and improve shooting experience of the user. In addition, diversified adjustment may be performed on a position relationship between the subject image and the preview image on the recording interface, to improve shooting functionality and interest.

With reference to the first aspect, in a possible design manner, the target shot subject and/or the target position are determined in response to indication operations of the user or are automatically determined by the electronic device, and the method further includes: The electronic device detects an operation of switching a target shot subject, and displays a subject image corresponding to a switched-to target shot subject on the recording interface; and/or detects an operation of switching a target position, and displays, on the recording interface, the subject image corresponding to the target shot subject located at a switched-to target position.

In this design manner, in a recording start moment and in a recording process, the electronic device may switch the target shot subject in a plurality of manners (for example, active switching and passive switching). For example, in the recording process, the electronic device may switch a current target shot subject to a target shot subject specified by the user based on a switching operation performed by the user. Then, the electronic device displays a subject image corresponding to the specified shot subject on the recording interface. In this way, better interaction experience can be achieved. For another example, the electronic device may further automatically determine a target shot subject in the recording process, and keep the target shot subject at a target position of a picture in the subject image. In this way, the electronic device can assist the user in shooting a video that can highlight the shot subject and the shot content even if a shooting skill of the user is limited, thereby reducing a shooting difficulty and improving video quality obtained by shooting.

In this design manner, for determining the target position by the electronic device and the switching manner, references may be made to the foregoing plurality of switching manners of the target shot subject. For example, the electronic device may use an initial target position (for example, a middle position of the image) of the target shot subject by default. In a preview process before recording or the recording process, the electronic device may move the target shot subject to a target position (for example, a position of a golden section ratio of the image) specified by the user based on a switching operation performed by the user. In this case, in the subject image displayed on the video recording interface after switching, the target shot subject is always located at the position of the golden section ratio of the image.

In a possible design manner, the electronic device may display an optional target position in the preview image, to indicate that the position may be used as a target position, so that the user can perform a switching operation by touching the target position in the preview image.

With reference to the first aspect, in a possible design manner, that the electronic device displays an ith frame of preview image and the subject image corresponding to the target shot subject on the recording interface, where i is a positive integer greater than 1, includes: The electronic device obtains the ith frame of preview image based on an ith frame of raw image; the electronic device performs smoothing processing on first position information of the target shot subject in the ith frame of preview image based on first position information of the target shot subject in an (i−1)th frame of preview image, to obtain second position information of the target shot subject; and then the electronic device crops the ith frame of preview image based on the second position information, to obtain the subject image corresponding to the target shot subject; and displays the ith frame of preview image and the subject image corresponding to the target shot subject on the recording interface.

In this design manner, the electronic device performs smoothing processing on the first position information in the ith frame of preview image by using the first position information in the (i−1)th frame of preview image, so that the first position information in the ith frame of preview image not only refers to an actual position of the target shot subject, but also combines the first position information in the (i−1)th frame of preview image (a position "predicted value" at a historical moment). Therefore, when the actual position of the target shot subject sharply changes due to a form change, for example, opening an arm, waving, or jumping, occurring in a moving process of the target shot subject, the actual position of the target shot subject in the ith frame of preview image can be adjusted by using the position "predicted value" at the historical moment. In this way, picture fluency of adjacent subject images is increased, and jumping and flashing in a picture in a recorded video due to a sharp background change can be further reduced. Therefore, video quality obtained through shooting is improved.

With reference to the first aspect, in a possible design manner, that the electronic device performs smoothing processing on first position information of the target shot subject in the ith frame of preview image based on first position information of the target shot subject in an (i−1)th frame of preview image, to obtain second position information of the target shot subject includes: The electronic device obtains a first position difference between the first position information of the target shot subject in the (i−1)th frame of preview image and the first position information of the target shot subject in the ith frame of preview image; and determines, based on the first position difference, to perform smoothing processing on the first position information in the ith frame of preview image based on the first position information of the target shot subject in the (i−1)th frame of preview image, to obtain the second position information of the target shot subject, where a second position difference between the second position information and the first position information in the (i−1)th frame of preview image is less than or equal to the first position difference.

In this design manner, the electronic device implements smoothing processing by reducing a change degree of the first position information. That is, the electronic device obtains a displacement amplitude (namely, the first position difference) of the target shot subject between the (i−1)th frame of preview image and the ith frame of preview image, and determines, based on the displacement amplitude, whether it is necessary to perform smoothing processing on the ith frame of preview image. When determining that it is necessary to perform smoothing processing, the electronic device smooths the first position information (an actual position at a current moment) in the ith frame of preview image by using the first position information (the position "predicted value" at the historical moment) in the (i−1)th frame of preview image. Therefore, after smoothing processing is performed, a displacement amplitude (namely, the second position difference) of the target shot subject is smaller, a background change span of the target shot subject is smaller, and the background is smoother.

With reference to the first aspect, in a possible design manner, the obtaining the ith frame of preview image based on an ith frame of raw image includes: The electronic device performs format processing on the ith frame of raw image to obtain an ith frame of first image, where the ith frame of first image of the electronic device is the ith frame of preview image; or the electronic device may further perform jitter displacement compensation processing on the ith frame of first image to obtain an ith frame of first output image, where the ith frame of first output image is the ith frame of preview image.

In this design manner, the preview image may be a first image on which no image stabilization processing is performed. The first image is directly obtained by performing format processing on the raw image collected by the camera, and therefore, is also referred to as a live image. Displaying the live image can make the picture more real and natural. The preview image may alternatively be a first output image on which image stabilization processing is performed. An image offset caused by camera jitter is compensated in the first output image, and therefore, the overall picture is clearer and more stable. In this way, selectively displaying the first image or the first output image on the recording interface can meet diversified shooting requirements of the user, thereby improving shooting experience of the user.

With reference to the first aspect, in a possible design manner, the performing jitter displacement compensation processing on the ith frame of first image to obtain an ith frame of first output image includes: The electronic device obtains picture jitter displacement information of the ith frame of first image relative to any one or more frames of first images before the ith frame of first image; and performs jitter displacement compensation processing on a picture in the ith frame of first image based on the picture jitter displacement information, to obtain the ith frame of first output image.

In this design manner, the any one or more frames of first images before the ith frame of first image may be used as a reference image when the electronic device performs image stabilization processing on the ith frame of first image. In this case, the obtained picture jitter displacement information is more accurate. The picture jitter displacement information is used to perform jitter displacement compensation processing, so that a more accurate image stabilization effect can be achieved. In the first output image obtained after image stabilization, pixels are not interfered by jitter and can remain at a stable position. Therefore, a picture including the pixels can achieve a clear and stable presentation effect.

With reference to the first aspect, in a possible design manner, the obtaining picture jitter displacement information of the ith frame of first image relative to any one or more frames of first images before the ith frame of first image includes: detecting a jitter amplitude of the electronic device; and determining the picture jitter displacement information based on the jitter amplitude, where the picture jitter displacement information includes an offset of each pixel in the ith frame of first image relative to a corresponding pixel in the any one or more frames of first images before the ith frame.

An acceleration sensor and a gyroscope sensor of a mobile phone may be used to detect a jitter amplitude of the mobile phone.

In this design manner, a picture jitter amplitude (namely, the picture jitter displacement information) of the first image is determined by detecting the jitter amplitude of the electronic device. In this way, an implementation is simpler and more efficient, and an image processing speed is improved.

With reference to the first aspect, in a possible design manner, the method further includes: performing downsampling processing on the ith frame of first image to obtain an ith frame of second image; and Before the performing smoothing processing on first position information of the target shot subject in the ith frame of preview image based on first position information of the target shot subject in an (i−1)th frame of preview image, the method further includes: The electronic device detects the target shot subject from the ith frame of second image, and obtains third position information of the target shot subject; and then the electronic device maps the third position information of the target shot subject to the ith frame of preview image, to obtain the first position information of the target shot subject in the ith frame of preview image.

In this design manner, subject tracking processing and image stabilization processing of the image are two parallel processing tasks, and the electronic device fuses results of the two tasks to obtain the second position information. In such a manner that the electronic device first performs parallel processing and then fuses the results, waiting time of a single task can be reduced. In addition, utilization of processor resources of the electronic device can be improved, and memory consumption is reduced, thereby improving a processing speed of obtaining the first position information of the target shot subject in the ith frame of preview image.

With reference to the first aspect, in a possible design manner, the cropping the ith frame of preview image based on the second position information, to obtain the subject image corresponding to the target shot subject includes: The electronic device determines a minimum bounding rectangular box of the target shot subject based on the second position information; and determines a cropping area based on the minimum bounding rectangular box, where the cropping area includes the minimum bounding rectangular box; and then the electronic device obtains an image corresponding to the cropping area in the ith frame of preview image, to obtain the subject image corresponding to the target shot subject.

The minimum bounding rectangular box is a minimum boundary rectangle that includes an outer contour of the target shot subject. The minimum bounding rectangular box may be determined by using coordinate values of uppermost/lowermost/leftmost/rightmost coordinate points on the outer contour.

In this design manner, the obtained cropping area includes the outer contour of the target shot subject, so that a cropped subject image can completely display the target shot subject.

With reference to the first aspect, in a possible design manner, after the obtaining an image corresponding to the cropping area in the ith frame of preview image, the method further includes: The electronic device zooms out or zooms in the image corresponding to the cropping area, to obtain the subject image corresponding to the target shot subject and with a preset display specification, where the preset display specification is a preset screen-to-body ratio of the electronic device.

In this design manner, the electronic device adjusts a specification of the cropped image to meet a requirement of an actual output specification. In this way, the subject image output based on the preset display specification is more clearly displayed on a screen, specifications of adjacent frames of subject images are the same, and a display effect is better.

With reference to the first aspect, in a possible design manner, the target position includes a middle position or a position of a golden section ratio.

The subject image obtained by the electronic device by performing composition based on the middle position and the golden section ratio is not only more beautiful, but also can highlight the target shot subject and video shot content, thereby implementing a visual optimal effect, making a presentation effect of the video or a vlog better, and improving shooting and viewing experience of the user.

With reference to the first aspect, in a possible design manner, the method further includes: The electronic device detects an end recording operation; and generating the video file, where the video file includes the subject image, or the video file includes the subject image and the preview image.

In this design manner, the subject image included in a video frame image in the video file is an image of the target shot subject in which both image stabilization and smoothing are considered and that is located at the target position. Therefore, the target shot subject can always remain at the optimal visual position in the video frame image in the video file, to highlight the target shot subject and the shot content. In addition, interference caused by the camera jitter is reduced in the video file, and picture transition between a subject image and a video frame image that are adjacent is more stable. The center point of the shot subject can be further smoothed, so that a degree of deviation of the shot subject in the subject image is small, ghosting is not prone to occur on the subject image and the video frame image, and the background is clearer.

With reference to the first aspect, in a possible design manner, the method further includes: displaying a shooting preview interface after the camera application is enabled, where the shooting preview interface includes the preview image, or the shooting preview interface includes the preview image and the subject image.

In this design manner, the electronic device may first preview, in real time, a presentation effect during starting recording, so that the user can know an actual effect of video recording in advance. When the user performs shooting creation, a shooting parameter may be adjusted on the preview interface based on a requirement, so that a better video effect is obtained after the electronic device enters the recording interface.

According to a second aspect, this application provides an electronic device, including: a camera configured to collect an image, a screen configured to display the foregoing preview interface and the recording interface, one or more processors, a memory, and one or more computer programs, where the one or more computer programs are stored in the memory, and the one or more computer programs include instructions. When the instructions are executed by the electronic device, the electronic device is enabled to perform the method according to the first aspect and the possible design manners of the first aspect.

According to a third aspect, this application provides a computer-readable storage medium. The computer-readable storage medium may include computer instructions. When the computer instructions are run on an electronic device, the electronic device is enabled to perform the method according to the first aspect and the possible design manners of the first aspect.

According to a fourth aspect, this application provides a computer program product. When the computer program product runs on a computer, the computer is enabled to perform the method according to the first aspect and the possible design manners of the first aspect.

It may be understood that the electronic device according to the second aspect, the computer storage medium according to the third aspect, and the computer program product according to the fourth aspect are all used to perform the foregoing corresponding methods. Therefore, for beneficial effects that can be achieved, refer to beneficial effects in the foregoing corresponding methods. Details are not described herein again.

BRIEF DESCRIPTION OF DRAWINGS

FIG. 3A and FIG. 3B are a flowchart of a shooting method according to an embodiment of this application;

DESCRIPTION OF EMBODIMENTS

Figure 1:
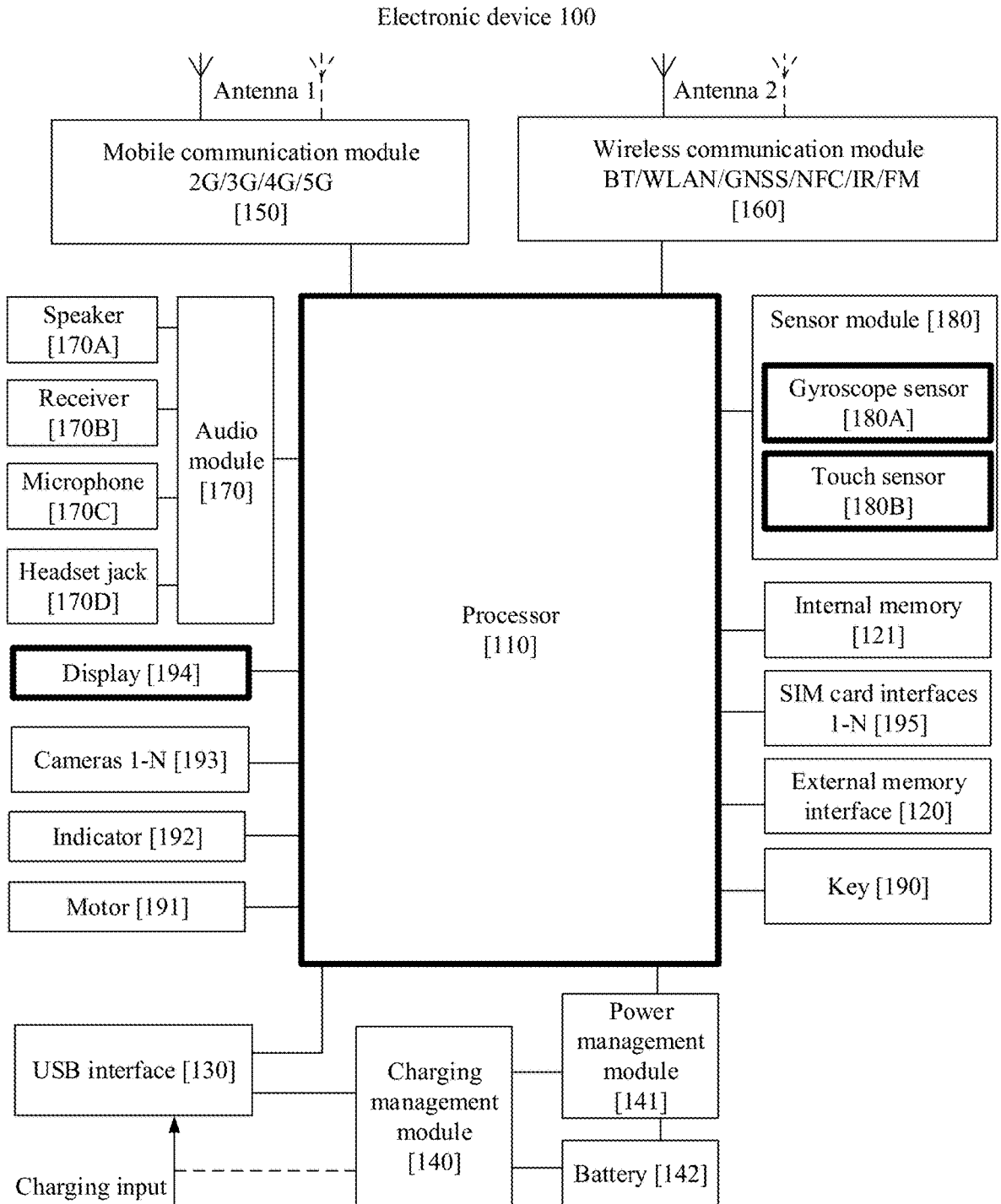
FIG. 1 is a schematic diagram of a hardware structure of an electronic device according to an embodiment of this application.

The following describes technical solutions in embodiments of this application with reference to accompanying drawings in embodiments of this application. In the descriptions of embodiments of this application, unless otherwise specified, "/" indicates "or". For example, A/B may represent A or B. In this specification, "and/or" is merely an association relationship for describing associated objects, and indicates that three relationships may exist. For example, A and/or B may indicate the following three cases: Only A exists, both A and B exist, and only B exists.

In the following, the terms "first" and "second" are used merely for the purpose of description, and shall not be construed as indicating or implying relative importance or implicitly indicating a quantity of indicated technical features. Therefore, features defined with "first" or "second" may explicitly or implicitly include one or more of the features. In the descriptions of the embodiments, unless otherwise stated, "a plurality of" means two or more.

In embodiments of this application, words such as "example" or "for example" are used to represent giving an example, an illustration, or a description. Any embodiment or design solution described as "example" or "for example" in embodiments of this application should not be construed as being more preferred or advantageous than other embodiments or design solutions. Exactly, the words such as "example" or "for example" are used to present related concepts in a specific manner.

When recording a video or a vlog, a user usually pays more attention to a shot subject, and expects the shot subject is always at an optimal visual position (for example, a center of an image or a position of a golden section ratio). However, the shot subject usually does not remain still during recording. Consequently, it is difficult for the shot subject to remain at the optimal visual position on the image, and a recorded video or vlog cannot achieve a shooting effect desired by the user.

Therefore, a shooting angle of a camera can be moved together with the shot subject, so that the shot subject can be at the optimal visual position as far as possible. This helps emphasize the shot subject and shot content, and improves a visual expression effect of a picture. However, in a process in which the shooting angle of the camera moves with the shot subject, it is difficult to ensure that moving frequencies of the camera and the shot subject are consistent. Consequently, the camera often moves too fast or too slow, causing a problem of deviation of the shot subject from a center of the picture, ghosting in a background of the shot subject, or the like.

In addition, a subject tracking technology may be further considered to identify and highlight position information of the shot subject on a shooting interface. The subject tracking technology achieves, by highlighting the position information, an effect of assisting the user in keeping the position information of the shot subject at the optimal visual position as far as possible when the user holds the camera for shooting. However, there are several problems in the subject tracking technology:

First, the technology can only be applied in a scenario in which the camera is fixed (for example, a camera tripod is used to fix the camera), to better assist the user in shooting a video in which the shot subject remains at the center of the picture. The camera is interfered by jitter of a hand of the user once the user holds the camera to record a video, thereby causing a subject position deviation of the shot subject. This subject position deviation caused by camera jitter cannot be resolved by using the subject tracking technology, which causes a problem that the shot subject cannot always be at the optimal visual position due to the camera jitter in a video shot by using the subject tracking technology.

Second, in a shooting process, if a form of the shot subject changes (for example, opening an arm, waving, or jumping), a sudden change at a center point of the shot subject may be caused, thereby causing a problem of deviation of the shot subject from the center of the picture, ghosting in the background of the shot subject, or the like in the shot video. A problem that the sudden change at the center point of the shot subject affects picture presentation quality cannot be resolved by using the subject tracking technology neither.

In addition, the subject tracking technology only plays an assistant role during shooting by the user. In this technology, the user needs to adjust, in real time based on a subject position, a video picture displayed on the interface. It is difficult for the user to adjust the video picture by adjusting a shooting position and a shooting angle of the camera in real time to precisely keep the shot subject in the shot video picture at the optimal visual position. Consequently, a shooting difficulty of the subject tracking technology is high, causing relatively poor shooting experience of the user.

Based on this, an embodiment of this application provides a shooting method. The method may be applied to an electronic device, and the electronic device includes a display and a camera. The electronic device enables a camera application, and enters a video shooting mode of subject tracking. In this mode, after starting recording a video, the electronic device processes a raw image collected by the camera, and displays a processed image on a recording interface. The electronic device performs jitter displacement compensation processing based on the raw image, to eliminate a subject position deviation caused by camera jitter; and performs smoothing processing on a position of the shot subject based on the raw image, to reduce impact of a sudden position change of the shot subject on the position of the shot subject. In this way, jitter compensation processing is performed on the shot subject in an image displayed on a recording interface, so that the shot subject is not interfered by the camera jitter, and can remain at a target position for being highlighted, achieving a picture stabilization effect.

In addition, the center point of the shot subject can be further smoothed in this embodiment of this application, so that a degree of deviation of the shot subject is small, ghosting is not prone to occur, and a background is clearer.

In addition, in this embodiment of this application, it is not necessary for the user to adjust, in real time based on the position of the shot subject, the video picture displayed on the interface to keep the shot subject at the target position, thereby reducing a shooting difficulty and improving shooting experience of the user.

In conclusion, the shot content and the shot subject can be stably and clearly highlighted during video shooting in this embodiment of this application, shooting quality of the video is improved, and a presentation effect of the video is better. Further, an operation of adjusting the picture by the user can be reduced, a shooting difficulty is reduced, and shooting experience of the user is improved.

The shooting method provided in this embodiment of this application may be applied to an electronic device provided a camera and a display. The electronic device may be a device such as a mobile phone, a tablet computer, a notebook computer, an ultra-mobile personal computer (Ultra-mobile Personal Computer, UMPC), a netbook, a personal digital assistant (Personal Digital Assistant, PDA), a camera, a digital camera, or a monitor. FIG. 1 is a schematic diagram of a structure of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like.

The sensor module 180 may include a pressure sensor, a gyroscope sensor 180A, a barometric pressure sensor, a magnetic sensor, an acceleration sensor, a distance sensor, an optical proximity sensor, a fingerprint sensor, a temperature sensor, a touch sensor 180B, an ambient light sensor, a bone conduction sensor, and the like.

It may be understood that the structure shown in this embodiment of this application constitutes no specific limitation on the electronic device 100. In some other embodiments of this application, the electronic device 100 may include more or fewer components than those shown in the figure, some components may be combined, some components may be split, or there may be different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), a micro controller unit (micro controller unit, MCU), and/or the like. Different processing units may be independent devices, or may be integrated into one or more processors.

The controller may be a nerve center and a command center of the electronic device 100. The controller may generate an operation control signal based on instruction operation code and a timing signal, to control instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, thereby improving system efficiency.

In some embodiments, the processor 110 may include one or more interfaces. The interfaces may include an inter-integrated circuit (inter-integrated circuit, I2C) interface, a serial peripheral interface (serial peripheral interface, SPI), an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The power management module 141 is configured to connect to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communication module 160, and the like. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna for a wireless local area network. In some other embodiments, the antenna may be used in combination with a tuning switch.

The mobile communication module 150 may provide a solution applied to the electronic device 100 for wireless communication including 2G/3G/4G/5G and the like. The wireless communication module 160 may provide a wireless communication solution that is applied to the electronic device 100, including a wireless local area network (wireless local area network WLAN) (for example, a Wi-Fi network), Bluetooth (Blue tooth, BT), a global navigation satellite system (global navigation satellite system, GNSS), frequency modulation (frequency modulation, FM), NFC, infrared (infrared, IR), and the like.

The electronic device 100 implements a display function by using the GPU, the display 194, the application processor, and the like. The GPU is a microprocessor for image processing and is connected to the display 194 and the application processor. The GPU is configured to perform mathematical and geometric computing for graphics rendering. The processor 110 may include one or more GPUs, and the one or more GPUs execute program instructions to generate or change displayed information.

The display 194 is configured to display an image, a video, and the like. The electronic device 100 may include one or N displays 194, where N is a positive integer greater than 1.

The electronic device 100 may implement a shooting function by using the ISP, the camera 193, the video codec, the GPU, the display 194, the application processor, and the like. The ISP is configured to process data fed back by the camera 193. The camera 193 is configured to capture a still image (also referred to as a raw image) or a video. In this embodiment of this application, the ISP is further configured to process a raw image collected by the camera as a first image and a second image, and allocate the first image and the second image to different processors to respectively perform image stabilization processing and subject tracking processing. In some embodiments, the electronic device 100 may include one or N cameras 193, where N is a positive integer greater than 1.

The NPU is a neural-network (neural-network, NN) computing processor, which quickly processes input information by referring to a biological neural network structure, for example, by referring to a transmission mode between human brain neurons, and may further perform self-learning continuously. Applications such as intelligent cognition of the electronic device 100 may be implemented by using the NPU, for example, subject identification, image stabilization processing, and subject position smoothing processing.

The external memory interface 120 may be configured to connect to an external memory card, for example, a Micro SD card, to expand a storage capability of the electronic device 100. The external memory card communicates with the processor 110 through the external memory interface 120, to implement a data storage function, for example, to store files such as music and a video in the external memory card.

The internal memory 121 may be configured to store computer-executable program code, and the executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playback function or an image playback function), and the like. The data storage area may store data (such as audio data and a phone book) created during use of the electronic device 100. In addition, the internal memory 121 may include a high-speed random access memory, and may further include a non-volatile memory, for example, at least one magnetic disk storage device, a flash memory device, or a universal flash storage (universal flash storage, UFS).

The electronic device 100 may implement audio functions by using the audio module 170, the speaker 170A, the receiver 170B, the microphone 170C, the headset jack 170D, the application processor, and the like, for example, implement music playing, audio recording, and voice interaction.

The gyroscope sensor 180A, also referred to as a gyroscope and an angular velocity sensor, may measure rotation and deflection actions of a mobile phone. In an implementation of this application, the gyroscope sensor 180A is configured to detect a jitter amplitude of the mobile phone. The jitter amplitude is used by the processor 110 to determine a picture jitter displacement, and offset compensation is performed on a video picture based on the picture jitter displacement.

The touch sensor 180B is also referred to as a "touch panel (TP)". The touch sensor 180B is configured to detect a touch operation performed on or near the touch sensor 180B. For example, the user performs an operation on a touchscreen or near the touchscreen by using any suitable object or accessory such as a finger or a stylus (for example, the user presses a "shoot" button). The touch sensor may transmit a detected touch operation to the application processor to determine a type of a touch event. In addition, a mobile phone 100 may provide a visual output related to the touch operation by using the display 194. In this embodiment of this application, the touch sensor 180B and the display are combined into the touchscreen. In some other embodiments, the touch sensor 180B may alternatively be disposed on a surface of the electronic device 100 at a position different from that of the display 194.

The key 190 includes a power-on key, a volume key, or the like. The motor 191 may generate a vibration prompt. The indicator 192 may be an indicator light, may be configured to indicate a charging status or a power change, and may be further configured to indicate a message, a missed incoming call, a notification, and the like. The SIM card interface 195 is configured to connect to a SIM card.

Figure 2:
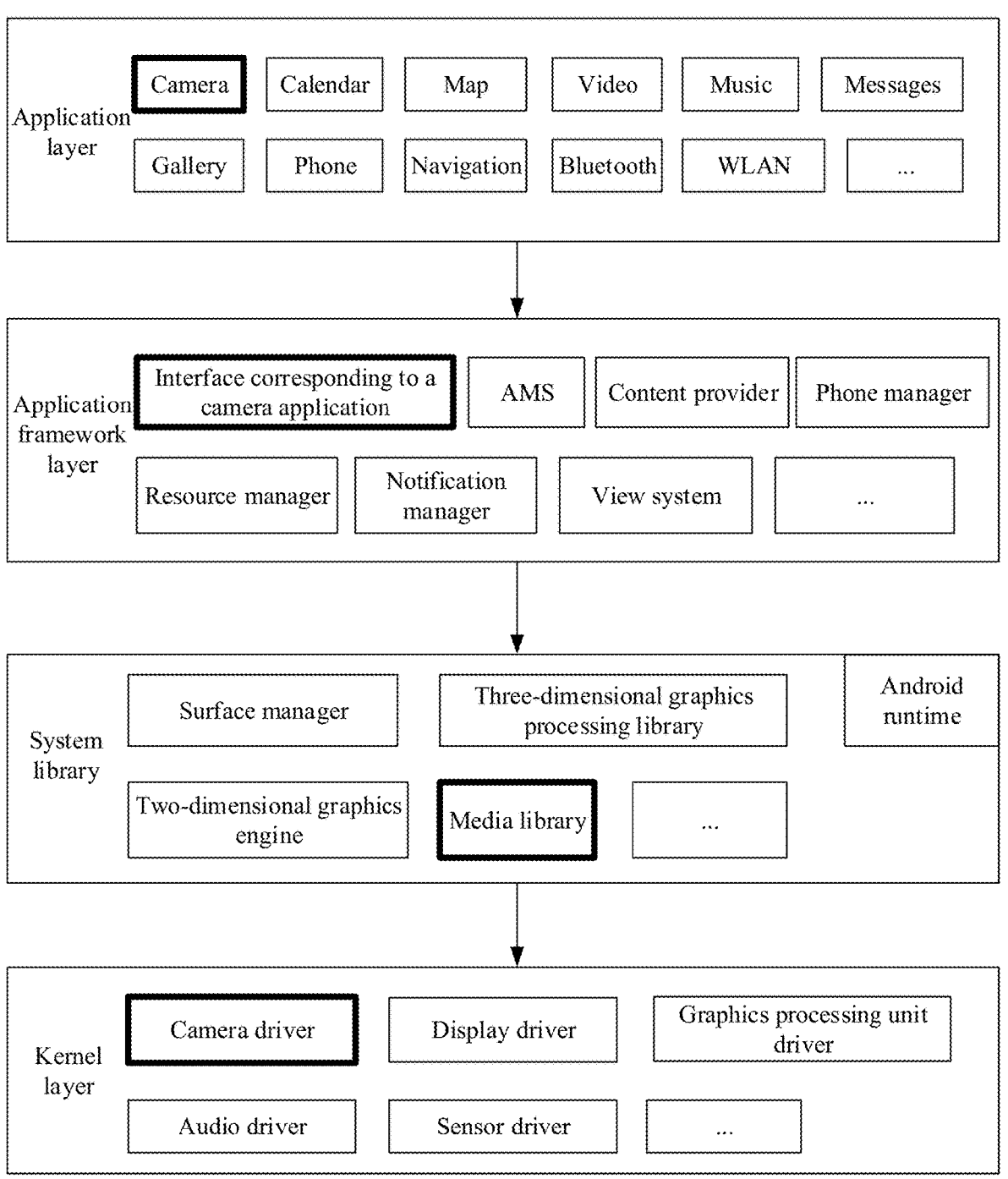
FIG. 2 is a schematic diagram of a software structure of an electronic device according to an embodiment of this application.

That the electronic device 100 is a mobile phone is used as an example. FIG. 2 is a block diagram of a software structure of a mobile phone according to an embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android Runtime) and system library, and a kernel layer from top to bottom.

As shown in FIG. 2, the application layer may include a series of application packages, and the application package may include applications such as Camera, Calendar, Map, Video, Music, Messages, Gallery, Phone, Navigation, Bluetooth, and WLAN.

The application framework layer provides an application programming interface (application programming interface, API) and a programming framework for the application at the application layer. The application framework layer includes some predefined functions.

As shown in FIG. 2, the application framework layer may include an interface corresponding to a camera application and an activity manager service (activity manager service, AMS) module. The AMS uniformly schedules an activity Activity of the application.

The application framework layer may further include a window manager, a content provider, a view system, a phone manager, a resource manager, a notification manager, and the like.

The window manager is configured to manage a window program. The window manager may obtain a size of a display, determine whether a status bar exists, lock a screen, take a screenshot, and the like.

The content provider is configured to store and obtain data, and enable the data to be accessible to an application. The data may include a video, an image, audio, calls that are made and answered, a browsing history and bookmarks, a phone book, and the like.

The view system includes visual controls such as a text display control and a picture display control. The view system may be configured to construct an application. A display interface may include one or more views. For example, a display interface including a Messages notification icon may include a view for displaying text and a view for displaying a picture.

The phone manager is configured to provide a communication function of the mobile phone 100, for example, call status management (including answering, hanging up, and the like).

The resource manager provides various resources for the application, for example, a localized string, an icon, a picture, a layout file, and a video file.

The notification manager enables an application to display notification information in a status bar, and may be configured to convey a notification message that may automatically disappear after a short stay without requiring user interaction. For example, the notification manager is configured to provide a notification of download completion, a message reminder, and the like. The notification manager may be further a notification that appears in the status bar at the top of the system in a form of a graph or scroll bar text, for example, a notification of an application running in the background, or a notification that appears on a screen in a form of a dialog window. For example, prompt text information is presented in the status bar, an alert sound is given, the mobile phone vibrates, and an indicator light flashes.

The Android Runtime includes a kernel library and a virtual machine. The Android Runtime is responsible for scheduling and management of the Android system.

The kernel library includes two parts: One part is a functional function that needs to be invoked by a java language, and the other part is a kernel library of Android.

The application layer and the application framework layer are run in the virtual machine. The virtual machine executes java files at the application layer and the application framework layer as binary files. The virtual machine is configured to perform functions such as lifecycle management of an object, stack management, thread management, security and exception management, and garbage collection.

As shown in FIG. 2, the system library may include a plurality of functional modules, for example, a surface manager (surface manager), a media library (Media Library, a three-dimensional graphics processing library (for example, an OpenGL ES), and a 2D graphics engine (for example, an SGL).

The surface manager is configured to manage a display subsystem, and provide fusion of 2D and 3D layers for a plurality of applications.

The media library supports playback and recording in a plurality of common audio and video formats, a still image file, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering and composition, layer processing, and the like.

The 2D graphics engine is a drawing engine for 2D drawing.

The kernel layer is a layer between hardware and software. The kernel layer includes at least a hardware driver and is configured to drive hardware to work.

As shown in FIG. 2, the kernel layer includes a camera driver, a display driver (display driver), a graphics processing unit driver (graphics processing unit driver, GPU driver), and the like.

The camera driver is configured to enable the camera to respond to an operation of the user. The kernel layer may further include an audio driver and a sensor driver.

The following describes an example of a workflow of the mobile phone with reference to the shooting method provided in this application. An icon of the camera application at the application layer may be displayed on the display of the mobile phone. When the icon of the camera application is touched by a finger of the user and the touch sensor 180B located on the display detects a touch operation, the mobile phone enables the camera application. The camera application invokes the camera driver at the kernel layer to enable the camera to respond to a recording operation. In a video recording process, the camera collects consecutive raw images, and the collected raw image is processed by the ISP as a first image and a second image. The first image and the second image are allocated to different processors 110, to perform subject tracking processing on the first image and perform image stabilization processing on the second image. Then, the processor 110 combines a subject tracking result with an image stabilization processing result, to obtain an image on which subject tracking processing and image stabilization processing are performed, and then performs smoothing processing on a subject position in the image to finally obtain a subject image. After starting recording a video, the mobile phone displays the subject image on the display. In the subject image, a shot subject can be kept at a target position when the user does not adjust, in real time based on a position of the shot subject, a video picture displayed on an interface. In addition, shot content and the shot subject can be stably and clearly highlighted during video shooting after image stabilization and smoothing are performed. Therefore, shooting quality of the video is improved, and a presentation effect of the video is better. Further, an operation of adjusting the picture by the user is reduced, and a shooting difficulty is reduced, thereby improving shooting experience of the user.

Figure 3A:
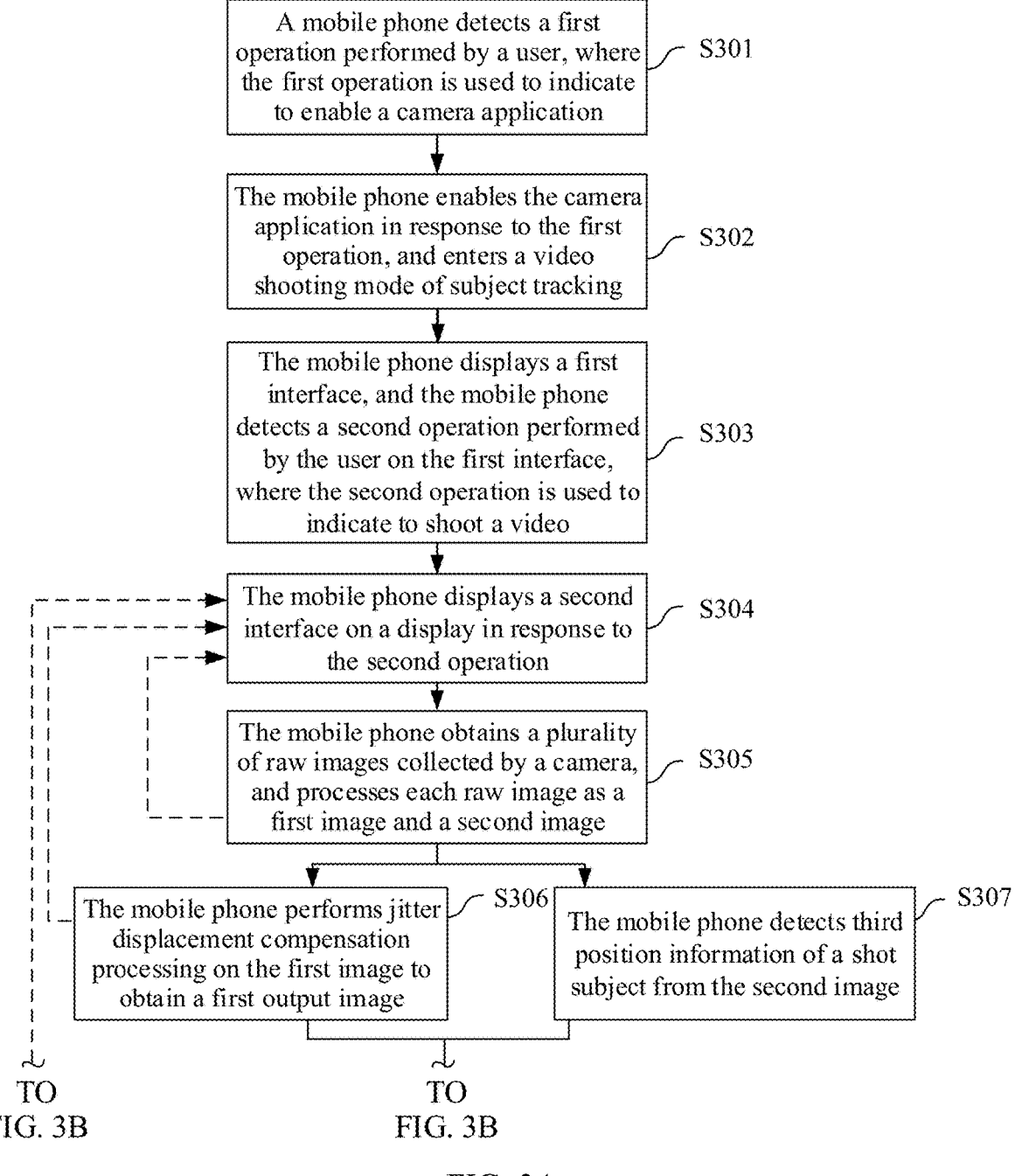

An embodiment of this application provides a shooting method. The method may be applied to an electronic device, and the electronic device includes a display and a camera. Based on an example in which the electronic device is a mobile phone, as shown in FIG. 3A and FIG. 3B, the shooting method may include the following steps:

S301: The mobile phone detects a first operation performed by a user, where the first operation is used to indicate to enable a camera application.

For example, the first operation includes an operation of touching an icon of the camera application on a desktop of the mobile phone by the user, a voice indication of the user, or a gesture operation of the user.

Figure 4A:
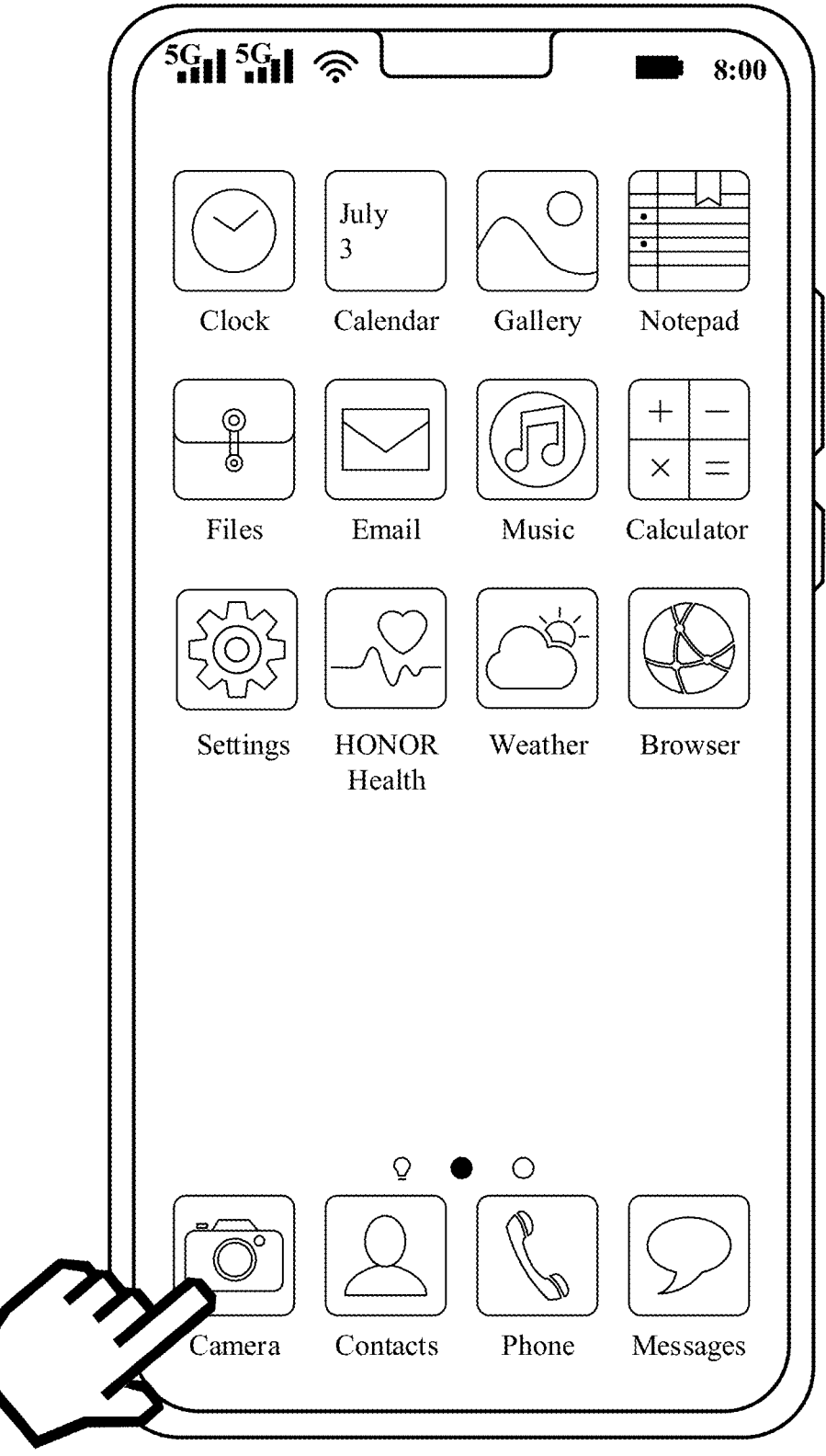
FIG. 4A and FIG. 4B are a schematic diagram of performing two types of first operations by a user according to an embodiment of this application.

In some embodiments, when the first operation is the operation of touching the icon of the camera application on the desktop of the mobile phone by the user, the mobile phone further includes a touch sensor. The touch sensor and the display are combined into a touchscreen, and image content is presented by using the touchscreen. As shown in FIG. 4A, the mobile phone displays the icon of the camera application on a graphical user interface (graphical user interface, GUI). A finger of the user touches the icon of the camera application, to indicate the mobile phone to enable the camera application.

It should be noted that, in this embodiment of this application, the camera application is not limited to the camera application corresponding to a camera icon on the desktop of the mobile phone, and may alternatively be an application with a camera function that is integrated into another application, for example, an application that is integrated into a chat software, a shopping software, or a short video social software and that is used for recording.

Figure 4B:

In some embodiments, when the first operation is the voice indication of the user, as shown in FIG. 4B, the user says commands such as "open the camera", "I want to record", and "enter a video shooting mode" within a preset range of the mobile phone, to indicate the mobile phone to enable the camera application.

In some embodiments, when the first operation is the gesture operation of the user, the user may mark, on the GUI of the mobile phone, a gesture operation that indicates to enable the camera application. The gesture operation may be a circle trajectory, a wave line trajectory, a cross line trajectory, or the like that is initially set or customized by the user.

After the user gives an indication of the first operation in the foregoing manner, the mobile phone detects the first operation, and then performs S302.

S302: The mobile phone enables the camera application in response to the first operation, and enters the video shooting mode of subject tracking.

It should be noted that a camera application that can implement the video shooting mode of subject tracking may be an existing camera application that is embedded with a subject tracking program and function, or may be a new application that has the video shooting mode of subject tracking. This is not limited in this embodiment of this application.

There are a plurality of ways for the mobile phone to enter the video shooting mode of subject tracking. In some embodiments, the mobile phone automatically enters the video shooting mode of subject tracking after enabling the camera application. In some other embodiments, after enabling the camera application, the mobile phone detects the video shooting mode of subject tracking selected by the user, and the mobile phone enters the mode.

Different from a conventional shooting mode, in a video shot in the video shooting mode of subject tracking, a shot subject always automatically appears at a target position at which a video picture is highlighted. In this way, when shooting a video, the mobile phone can automatically stably and clearly highlight shot content and the shot subject in the video, thereby improving shooting quality and a presentation effect of the video, and improving shooting experience of the user.

In this step, an optimal visual position that can highlight the shot content and the shot subject is indicated by using the target position, and the target position includes an initial setting position or a user-defined position. The initial setting position or the user-defined position includes a center of an image or a position of a golden section ratio.

Figure 5A:
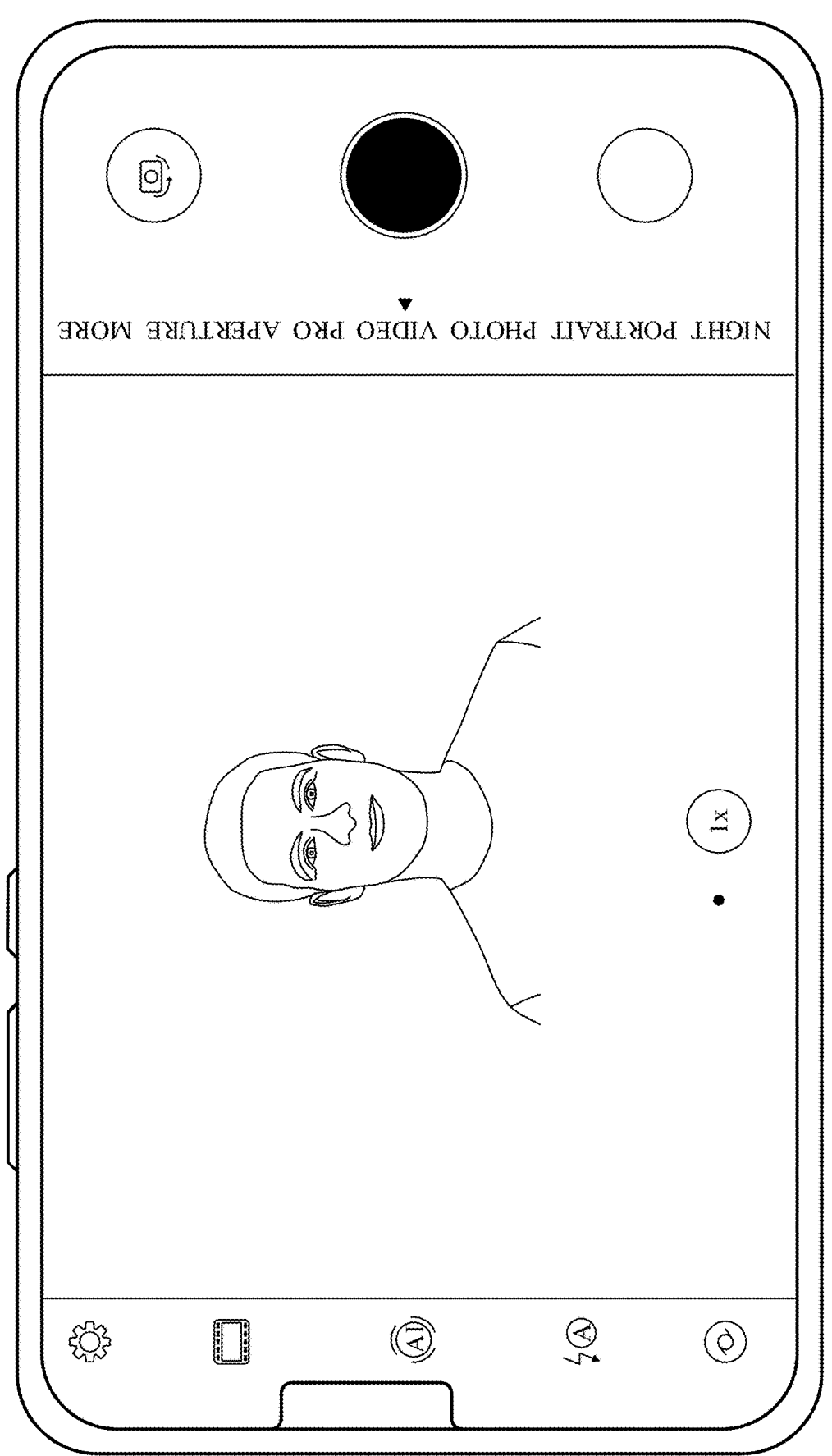
FIG. 5A and FIG. 5B are a schematic diagram of a group of target positions according to an embodiment of this application.

In some embodiments, the target position includes the center of the image, as shown in FIG. 5A. In this case, a subject in the shot video is always at a center of a picture in the video shooting mode of subject tracking.

Figure 5B:
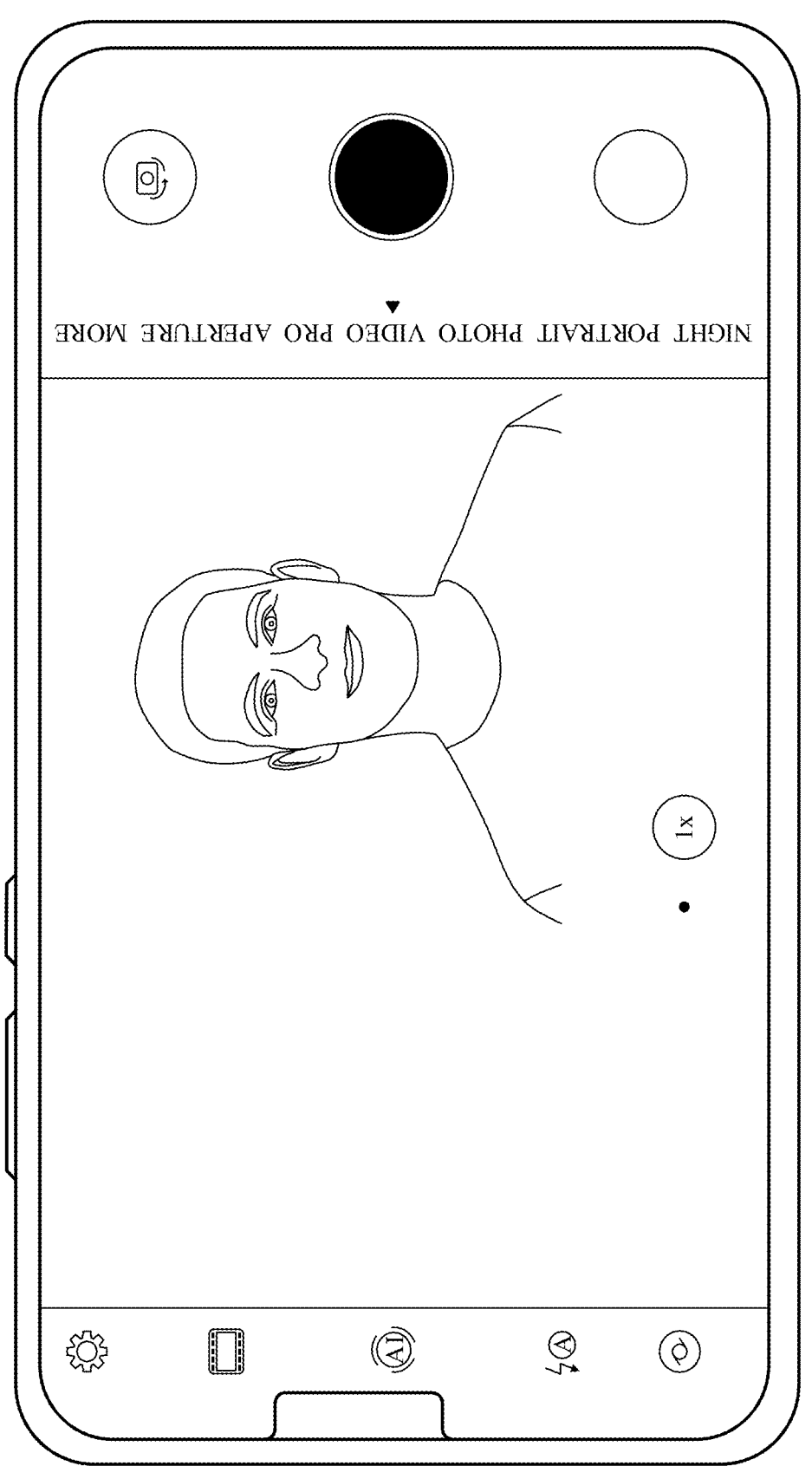

In some other embodiments, the target position includes the position of the golden section ratio, as shown in FIG. 5B. If the initial setting position or the user-defined position is the position of the golden section ratio, the shot subject is always at the position of the golden section ratio of the picture in a shooting process.

S303: The mobile phone displays a first interface, and the mobile phone detects a second operation performed by the user on the first interface, where the second operation is used to indicate to shoot a video.

The first interface (also referred to as a preview interface) is a shooting preview interface in the video shooting mode of subject tracking. An image displayed on the first interface is obtained based on a raw image collected by the camera before the user performs the second operation.

The second operation is used to indicate the camera to start recording a video (including recording a vlog). The second operation includes: touching a shooting button on the first interface by the user, or a voice instruction such as "start shooting" said by the user, or a gesture operation of the user. For the second operation, refer to descriptions of the first operation in S301. Details are not described herein again.

After the user gives an indication of the second operation in the foregoing manner, the mobile phone detects the second operation, and performs S304.

S304: The mobile phone displays a second interface on the display in response to the second operation.

The second interface (also referred to as a recording interface) is a recording interface on which the mobile phone starts recording a video after responding to the second operation. In a video recording process, the camera successively collects raw images, the mobile phone processes the raw images and displays a processed image on the second interface. The second interface includes a subject image processed based on the raw image, or the second interface further includes a first image or a first output image processed based on the raw image (the first image and/or the first output image are also referred to as a preview image).

In some embodiments, in the video recording process, before the mobile phone processes the obtained image, the second interface may display the raw image, or the second interface may not display any image. After the mobile phone processes the obtained image, the second interface displays the processed image, for example, the subject image and the first image or the first output image.

In the video recording process, a process in which the mobile phone processes the raw image and displays the processed image on the second interface may include S305-S311.

S305: The mobile phone obtains a plurality of raw images collected by the camera, and processes each raw image as the first image and a second image.

In the video recording process, the camera successively collects the raw images, and the mobile phone processes the raw image as the first image. The raw image may be a raw (raw) image directly collected by the camera, or may be a raw image collected and synthesized by a plurality of cameras. This "raw" may be understood as "not processed", that is, the raw image is a raw image directly output by a sensor of the camera. Because the raw image is not processed and edited, an original internal color of a wide color gamut is still reserved, and quality of the image is higher.

In this step, the mobile phone inputs the raw image into an image processing unit, and the image processing unit processes the raw image as the first image and the second image. The first image is used to perform image stabilization processing of the image, and the second image is used to perform subject tracking processing. In some embodiments, the mobile phone displays the first image on the second interface. Displaying the first image (also referred to as a live image) on the second interface can make the picture more real and natural, and reserving a jitter effect of the picture can make a video viewer immersed in the scene, thereby improving video shooting and viewing experience.

In some embodiments, a size of the first image is the same as a size of the raw image, and both are an original size. The second image is an image with a relatively small size obtained by performing downsampling on the first image. The size is indicated by M pixels*N pixels. To be specific, a quantity of pixels of the second image is less than a quantity of pixels of the first image, and resolution of the second image is lower than resolution of the first image. In this case, video quality presented by the first image is higher, the picture is clearer, and an obtained jitter displacement used in image stabilization processing has higher precision. The second image used for subject detection has a smaller calculation amount and a faster processing speed. Certainly, in some embodiments, the size of the first image may be smaller than the size of the raw image. Alternatively, a size of the second image may be greater than or equal to the size of the first image. Alternatively, when the size of the first image is smaller than the size of the raw image, the size of the second image is smaller than the size of the first image. The size of the first image and the size of the second image are not limited in this embodiment of this application.

For example, both the first image and the second image may be luminance chromaticity saturation (YUV) images. The YUV image refers to an image obtained by using a YUV coding method. YUV is a color coding method used in a European television system. Usually, a three-tube color camera may be used to obtain an image. Then, color separation, and amplification and correction are separately performed on an obtained color image signal to obtain RGB. Then, a luminance signal Y and two chromatic aberration signals R-Y (namely, U) and B-Y (namely, V) are obtained by using a matrix transform circuit. Finally, a transmit end separately encodes the three signals of luminance and chromatic aberration to obtain the YUV image. Advantages of using the YUV image are that imaging quality is high, a video is clear, and details are good. Certainly, the first image and the second image may alternatively be bitmaps, (Bitmap, BMP), joint photographic experts group (joint photographic experts group, JPEG) images, or the like. Formats of the first image and the second image are not limited in this embodiment of this application.

After the first image and the second image are obtained, the image processing unit allocates the first image and the second image to different processors for parallel processing, as shown in S306 to S309 below.

S306: The mobile phone performs jitter displacement compensation processing on the first image to obtain a first output image.

In some embodiments, a method for performing image stabilization processing on the first image by the mobile phone may include S1-S2. In other words, S306 includes S1-S2.

S1: The mobile phone determines an offset of the first image.

Picture jitter of the first image comes from a position (the position may be indicated by coordinates) offset of a pixel in the first image. Therefore, the offset of the first image can be determined by using a relative displacement difference of each pixel in the first image. For example, the first image that is being processed by the mobile phone is used as a current frame of first image, and an image collected in a previous frame of the current frame of image is a previous frame of first image. In this case, relative pixel displacement indicates a displacement difference of a pixel corresponding to a same shot subject at a position of the current frame of first image relative to a position of the previous frame of first image. Therefore, displacement differences of all pixels can be obtained based on each frame of first image, and are denoted as a group of relative pixel displacement. If relative pixel displacement of a 1st frame of first image is $s0=0$, relative pixel displacement of a 2nd frame of first frame is $s1, \ldots$, and relative pixel displacement of an Nth frame of first image is $sn-1$, N frames of first images correspond to N groups of relative pixel displacement. Offsets of the N frames of first images can be determined by using the N groups of relative pixel displacement.

In some embodiments, to facilitate data storage and query, each group of relative pixel displacement may be stored in a warp map (warp map). In this way, the mobile phone can directly compensate, by using the warp map, for a displacement difference of the first image caused by jitter. A specific compensation method is shown in S2.

S2: The mobile phone obtains the first output image based on the first image and the offset.

The first output image is an output image obtained by compensating for the offset (for example, the relative pixel displacement in the warp map) of the first image.

In some embodiments, the first image may be cropped, so that the pixel corresponding to the same shot subject has a same position in the current frame of first image as in the previous frame of first image. Specifically, when a position of a pixel in the current frame of first image is higher than that in the previous frame of first image, a cropping box is at an upper position in the first image, and a removed part is a lower image in the first image. In this way, the shot subject in a cropped image is still at a same or near same position in the current frame of first image as the previous frame of first image. On the contrary, when a position of a pixel in the current frame of first image is lower than that in the previous frame of first image, a cropping box is at a lower position in the first image, and a removed part is an upper image in the first image. In this way, in this embodiment, image content that needs to be cropped and a part remained after cropping can be determined by using the offset, so that positions of a pixel in a current frame of first output image obtained through cropping and a previous frame of first output image remain consistent. In this way, jitter compensation is implemented on a jitter picture of the camera by compensating for a position offset of the pixel.

In some embodiments, the mobile phone displays, on the second interface, the first output image on which jitter compensation processing is performed instead of the first image. Therefore, the shot subject in the first output image can remain at the target position without being affected by camera jitter, thereby achieving a picture stabilization effect.

In some embodiments, image stabilization processing may be implemented by using an electric image stabilization (Electric Image Stabilization, EIS) technology. The EIS detects a jitter amplitude of the mobile phone by using an acceleration sensor and a gyroscope sensor of the mobile phone, determines picture jitter displacement based on the jitter amplitude, and compensates for the offset of the first image based on the picture jitter displacement. In addition, image stabilization processing may alternatively be implemented by using an optical image stabilizer (Optical Image Stabilizer, OIS). An image stabilization method is not limited in this embodiment of this application.

S307: The mobile phone detects first position information of the shot subject from the second image.

For a specific method in which the mobile phone detects the first position information of the shot subject from the second image, refer to a tracking algorithm such as a pedestrian re-identification (re-identification, ReID) algorithm in the foregoing embodiments and the conventional technology. Details are not described herein again in this embodiment of this application.

In this embodiment, S307 and S306 may be processed in parallel, for example, S307 is performed by using a subject detection and tracking unit in the mobile phone, and S306 is performed by using an image stabilization unit in the mobile phone. In this design manner, time for processing the first image and the second image is more flexible, and therefore, a system processing speed can be increased.

S306 and S307 are two steps that may be independently processed. Therefore, in some other embodiments, after performing S305, the mobile phone may first perform S307, and then perform S306; or after performing S305, the mobile phone may first perform S306, and then perform S307. That is, an execution sequence of image stabilization processing and subject tracking processing is not limited in this application.

After performing image stabilization processing by using the foregoing method and detecting the first position information, the mobile phone performs S308.

S308: The mobile phone maps the first position information of the shot subject to the first output image, to obtain second position information of the shot subject in the first output image.

In this step, a position of the shot subject is determined from the first output image, to eliminate interference of the camera jitter, so that a position change of the shot subject is only affected by the shot subject. For example, after the interference of the camera jitter is eliminated, when the position of the shot subject does not change (for example, when a pet is still), obtained second position information between two adjacent first output images remains unchanged or nearly unchanged. When the shot subject changes, obtained second position information between two adjacent first output images changes only because a movement position of the pet changes, and is not affected by a camera jitter factor.

It should be noted that, in this embodiment of this application, according to S308, the first position information obtained through subject detection processing in S307 is mapped to the first output image obtained through image stabilization processing in S306, to fuse an image stabilization result with a subject tracking result to obtain the second position information. In such a manner that parallel processing is first performed and then result fusion is performed, for performance and consumption of the mobile phone, pressures of power consumption of performance can be reduced, and a processing speed of a processor of the mobile phone can be increased.

After obtaining the first output image, the mobile phone performs smoothing processing on the shot subject in the first output image, and the mobile phone performs S309.

S309: The mobile phone determines, based on the second position information, whether position information of the shot subject in the current frame of first output image is consistent with position information in the previous frame of first output image, and when determining that positions of the shot subject are inconsistent, the mobile phone performs smoothing processing on the position information of the shot subject in the current frame of first output image based on historical position information, to obtain third position information of the shot subject in the first output image.

The historical position information includes position information of the shot subject in any one or more frames of images of the first output image before the current frame. The position information includes a coordinate position of a coordinate box, and the coordinate position includes a coordinate point, or the coordinate position may further include a coordinate box size.

In this step, the mobile phone performs smoothing processing on the shot subject, so that obtained smoothness of a subject background change of the shot subject in the first output image is greater than smoothness of a background change of a target shot subject in the first output image/the first image before processing.

Figure 6:
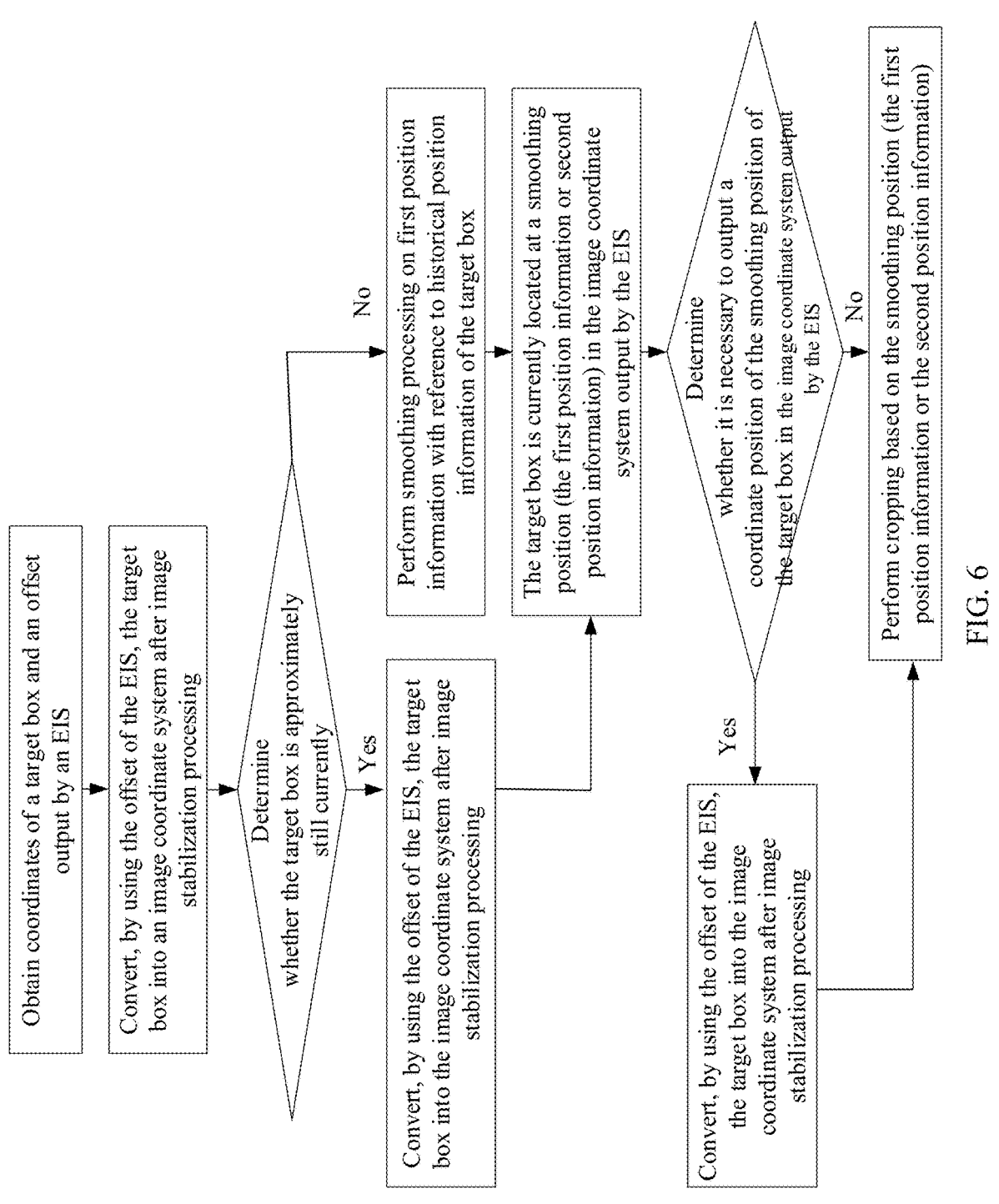
FIG. 6 is a flowchart of a smoothing processing method according to an embodiment of this application.

For example, smoothing processing is shown in FIG. 6. The mobile phone obtains coordinates of a target box and warp information (also referred to as the offset) output by the EIS, and converts, by using the warp information of the EIS, the target box into an image coordinate system after image stabilization processing, to obtain the second position information. The mobile phone obtains historical position information of a previous frame of image, and determines, by using whether the second position information is consistent with the historical position information, whether the target box is approximately still currently. If consistent, it indicates that the position of the shot subject does not change. A current position of the target box is set to a position same as a historical position in the previous frame of image, and a current smoothing position (the second position information) of the target box in the image coordinate system output by the EIS is output. If inconsistent, it indicates that the position of the shot subject in the current frame of first output image changes relative to the previous frame. In this case, smoothing processing is performed on a changed subject position, to output a current smoothing position (the third position information) of the target box in the image coordinate system output by the EIS. After the smoothing position is obtained, it is determined whether it is necessary to output a coordinate position of the smoothing position of the target box in the image coordinate system output by the EIS. If yes, cropping is performed based on the smoothing position, so that both image stabilization and smoothing are considered in a cropped image. If no, the smoothing position is converted into a coordinate system of the first image before image stabilization processing by using the warp information of the EIS, so that a relatively smoothing effect of an overall position change of the subject in the first output image from a first frame to an Nth frame is implemented in a cropped image.

Smoothing processing includes removing an exception value, filtering processing, and the like. In some embodiments, filtering may include high-speed filtering or Kalman filtering. In this embodiment, for example, smoothing processing is Kalman filtering processing. Kalman filtering calculates a "predicted value" (namely, the third position information) at a current moment by using a "predicted value" (namely, the historical position information) at a historical moment and a "true value" (namely, the second position information) at the current moment. The third position information is predicted by referring to both the second position information at the current moment and the "historical position information" at the historical moment. Therefore, if the second position information significantly changes compared with the historical position information (for example, an object in a picture quickly passes, so that a displacement amount between the second position information and the historical position information is excessively large), Kalman filtering performs smoothing processing on the second position information by using the historical position information, to reduce a variation amplitude of the second position information, and obtain the third position information after smoothing. A displacement amount between the third position information and the historical position information is less than the displacement amount between the second position information and the historical position information. Therefore, smoothing processing can avoid impact on quality of the first image due to a form change, for example, opening an arm, waving, or jumping, that occurs in a moving process of the shot subject and that causes a sudden change at a center point, and this processing improves shooting quality of the video.

It should be noted that in the foregoing S306-S309, the mobile phone first performs subject detection processing and image stabilization processing, and then fuses the two results to obtain the second position information of the shot subject in the first output image after image stabilization processing, and then the mobile phone performs smoothing processing. In some embodiments, after performing subject detection processing, the mobile phone may first perform smoothing processing on the first position information, and then perform image stabilization processing. For descriptions of these embodiments, refer to the following descriptions about a second shooting device and a corresponding shooting method. In addition, in some embodiments, the mobile phone may first perform image stabilization processing, then, perform subject detection processing on the first output image obtained after image stabilization, and finally perform smoothing processing. For descriptions of these embodiments, refer to the following descriptions about a third shooting device and a corresponding shooting method. That is, a processing sequence of performing subject detection processing, image stabilization processing, and smoothing processing by the mobile phone may be selected based on an actual situation. This is not limited in this embodiment of this application.

S310: The mobile phone obtains the shot subject in the first image, and determines a target shot subject from the shot subject.

For a step of obtaining the shot subject in the first image by the mobile phone, refer to the tracking algorithm such as the pedestrian re-identification (re-identification, ReID) algorithm in the foregoing embodiments and the conventional technology. Details are not described herein again in this embodiment of this application.

In some embodiments, S310 further includes:

S3: The mobile phone displays a subject box of the shot subject on the first image of the second interface.

The subject box is used to identify a user-switchable shot subject. This identification manner includes: enclosing a header area of the shot subject by using a pair of brackets (also referred to as square brackets), or adding a special effect of outlining to an outer contour of a trackable shot subject, or using a rectangular box to indicate the trackable shot subject.

S4: The mobile phone detects a third operation performed by the user, where the third operation is used to select at least one subject box when the first image includes a plurality of subject boxes, and the mobile phone determines the target shot subject from the shot subject based on the third operation.

In the foregoing S3-S4, the mobile phone displays a subject box of each shot subject, and determines, based on the at least one subject box selected by the user, a target shot subject specified by the user. Therefore, in the video recording process, if the target shot subject changes (for example, the mobile phone detects an operation of switching the target shot subject by the user), the subject image displayed on the second interface also correspondingly changes, so that a changed target shot subject can remain at the target position for being highlighted, both smoothing and image stabilization are considered in a subject image in which the target shot subject is located, and a shooting effect presented is good. The operation of switching the target shot subject by the user may be that the user successively selects subject boxes of different shot subjects in the recording process. For example, in the video recording process, the user first selects a subject box of the header of a father, and the second interface displays a subject image in which the father remains at the target position for being highlighted. When the user selects a subject box of the head of a younger brother, the second interface displays a subject image in which the younger brother remains at the target position for being highlighted. In this way, switching of the target shot subject can be implemented.

In some other embodiments, S310 further includes: The mobile phone obtains the shot subject in the first image. The mobile phone uses a shot subject at the target position at a first moment as the target shot subject. In this embodiment, the mobile phone automatically determines the target shot subject from the shot subject. The first moment is a moment of starting recording a video, or the first moment is t moments after video recording starts (0<t<=300, millisecond ms), where t may be 10 ms, 20 ms, 50 ms, 100 ms, 200 ms, or the like.

After determining the target shot subject, the mobile phone performs S311.

S311: The mobile phone crops a subject image corresponding to the target shot subject in the first output image based on the third position information, and displays the subject image on the second interface.

In this step, the mobile phone crops an area in which the target shot subject is located after image stabilization processing and smoothing processing, to obtain the subject image. The target shot subject in the cropped subject image remains at the target position for being highlighted. The target position may include a middle position of a picture, a position of a golden section ratio, or another position at which the shot subject is highlighted. In this way, when the user wants to highlight the target shot subject in a shot picture, the mobile phone may display and track the target shot subject, so that the target shot subject is at a highlighted position in the picture. In this way, in this step, jitter position compensation processing is performed to improve picture stability, and by using smoothing processing, position smoothing is performed on a shot subject with a rapid movement speed, to achieve an effect of a fluent picture.

Figure 7A:
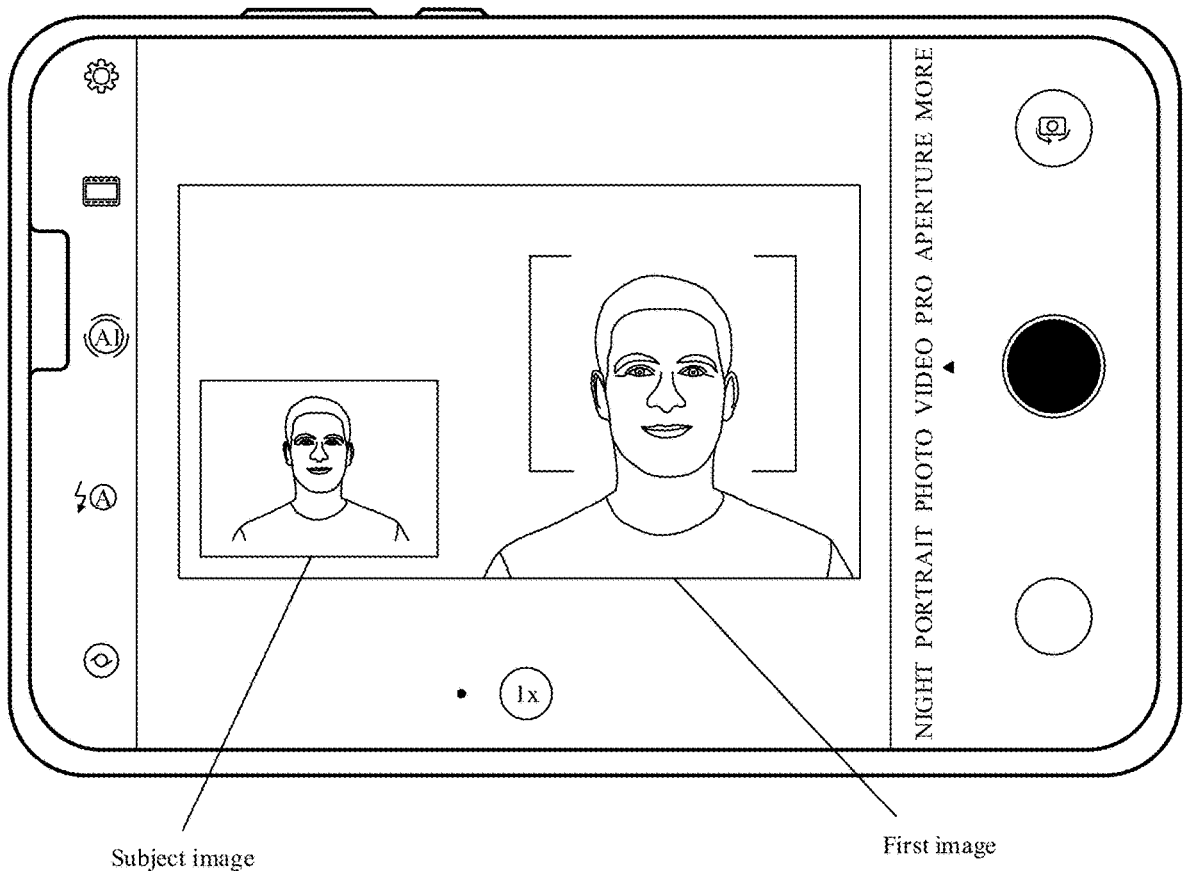
FIG. 7A to FIG. 7C are a schematic diagram of a group of second interfaces according to an embodiment of this application.
Figure 7B:
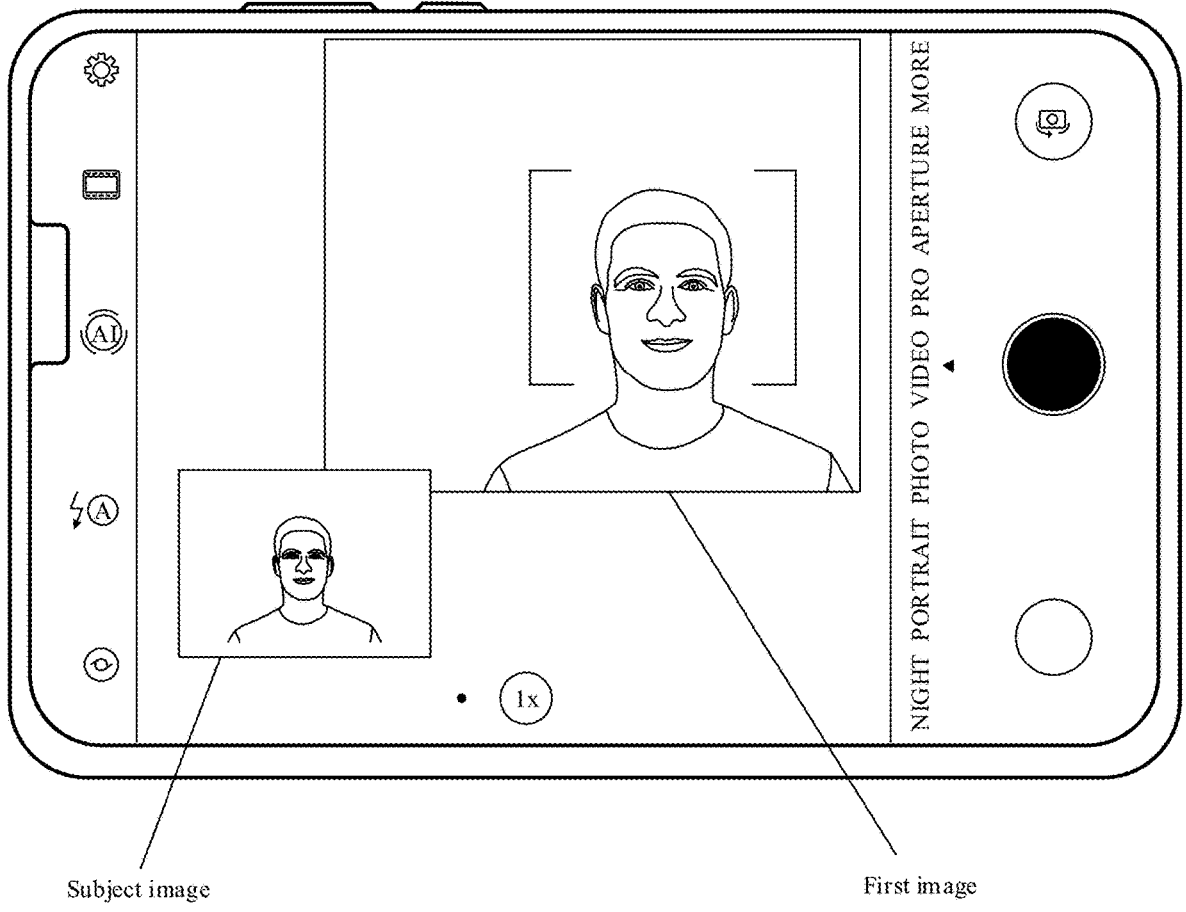
Figure 7C:
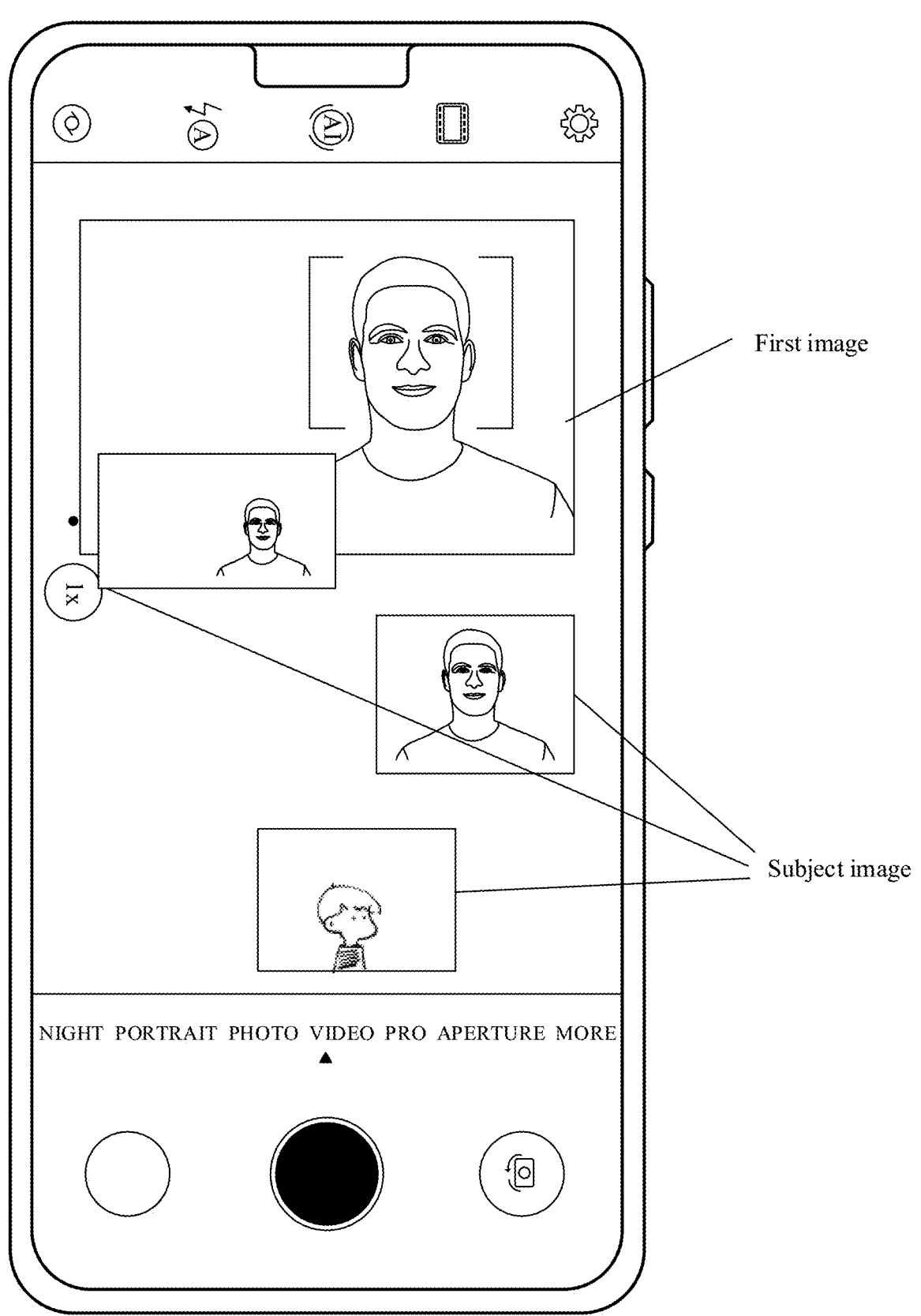

In some embodiments, for the second interface displayed by the mobile phone, refer to FIG. 7A to FIG. 7C. As shown in FIG. 7A, the subject image on the second interface may be displayed in an area of the first image. As shown in FIG. 7B, the second interface may be displayed outside an area of the first image. As shown in FIG. 7C, there are 1 to N subject images, where N is a tracking quantity preset by the camera application or a tracking quantity set by the user.

In this embodiment, the first image includes at least one shot subject, and a shot subject that needs to be highlighted is the target shot subject. There may be one or more target shot subjects highlighted in the first image. Each subject image may include one or more target shot subjects. When the subject image includes a plurality of target shot subjects, positions of the target shot subjects include a plurality of situations. For example, one target shot subject is located at the target position, or two target shot subjects are distributed on two sides of the target position, or two target shot subjects are located at the target position.

In some embodiments, a quantity of subject images displayed by the mobile phone on the second interface corresponds to a quantity of subject boxes selected by the user on the first interface. There may be one or more subject boxes and subject images. In some embodiments, the quantity of subject images may be greater than the quantity of subject boxes, or equal to the quantity of subject boxes, or less than the quantity of subject boxes. Each subject image may display one or more subjects.

In a first application scenario, there is one subject image, and the subject image displays a target shot subject corresponding to a subject box selected by the user.

Figure 8A:
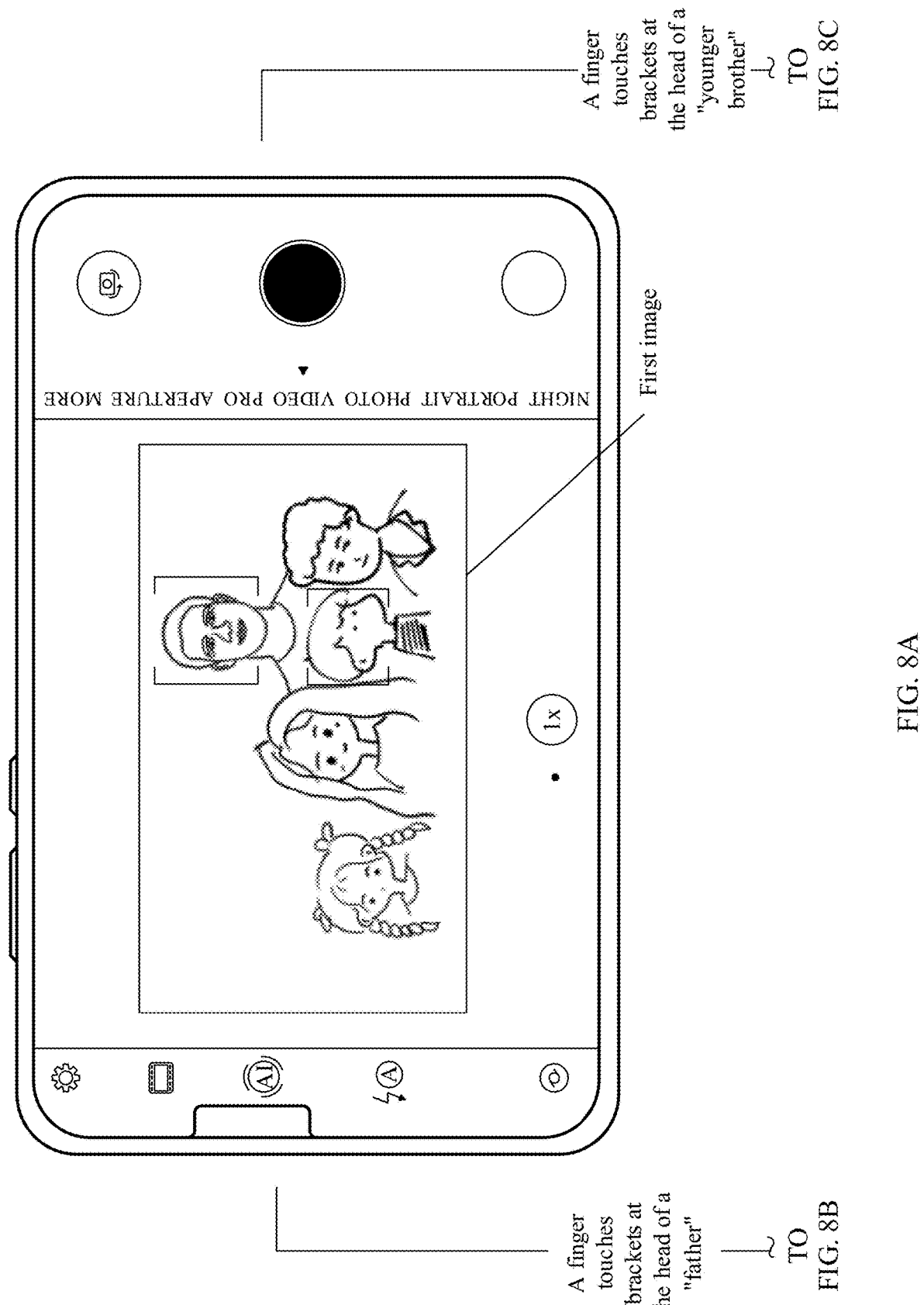
FIG. 8A to FIG. 8C are a schematic diagram of a subject image in a first application scenario according to an embodiment of this application.
Figure 8B:
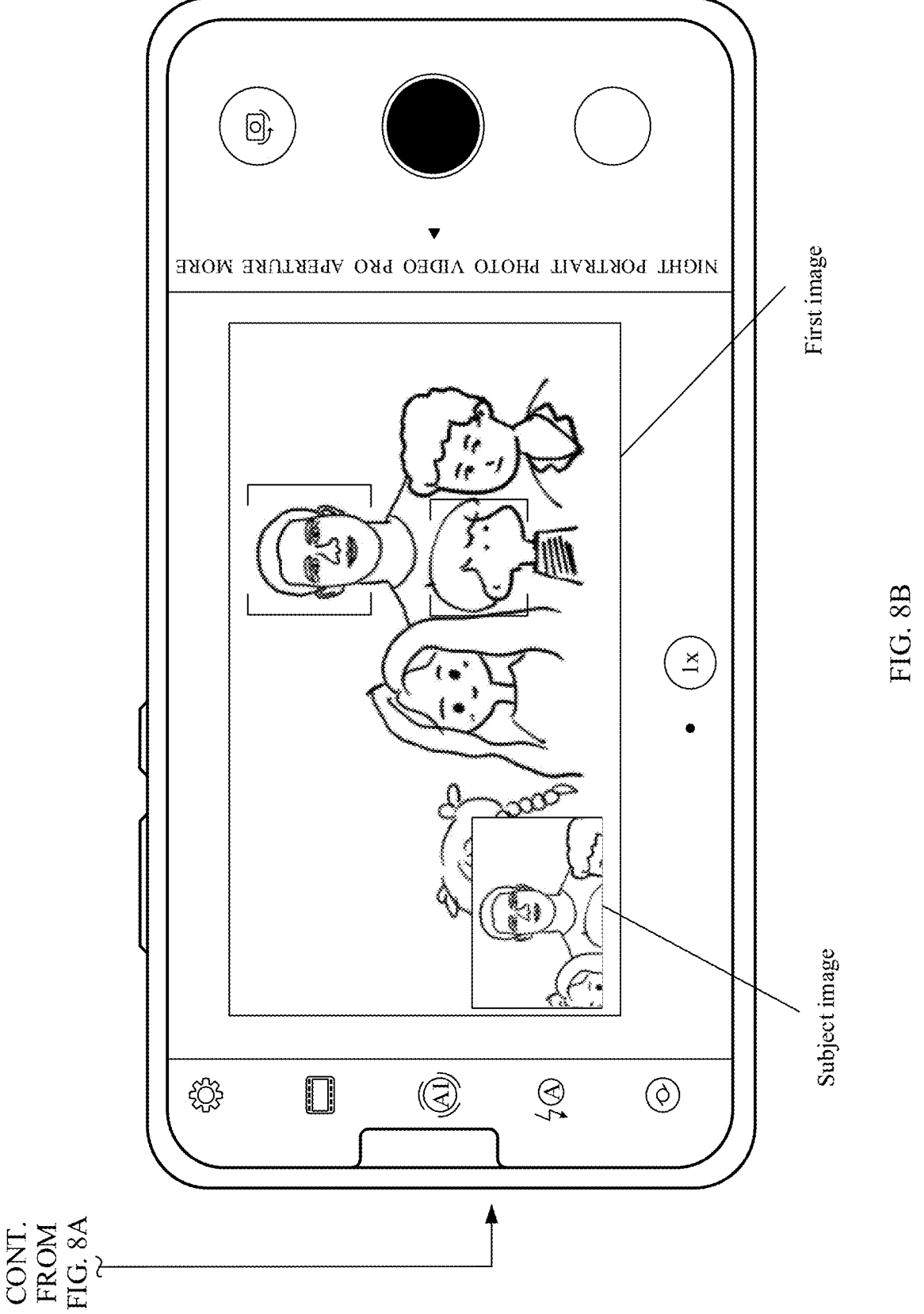
Figure 8C:
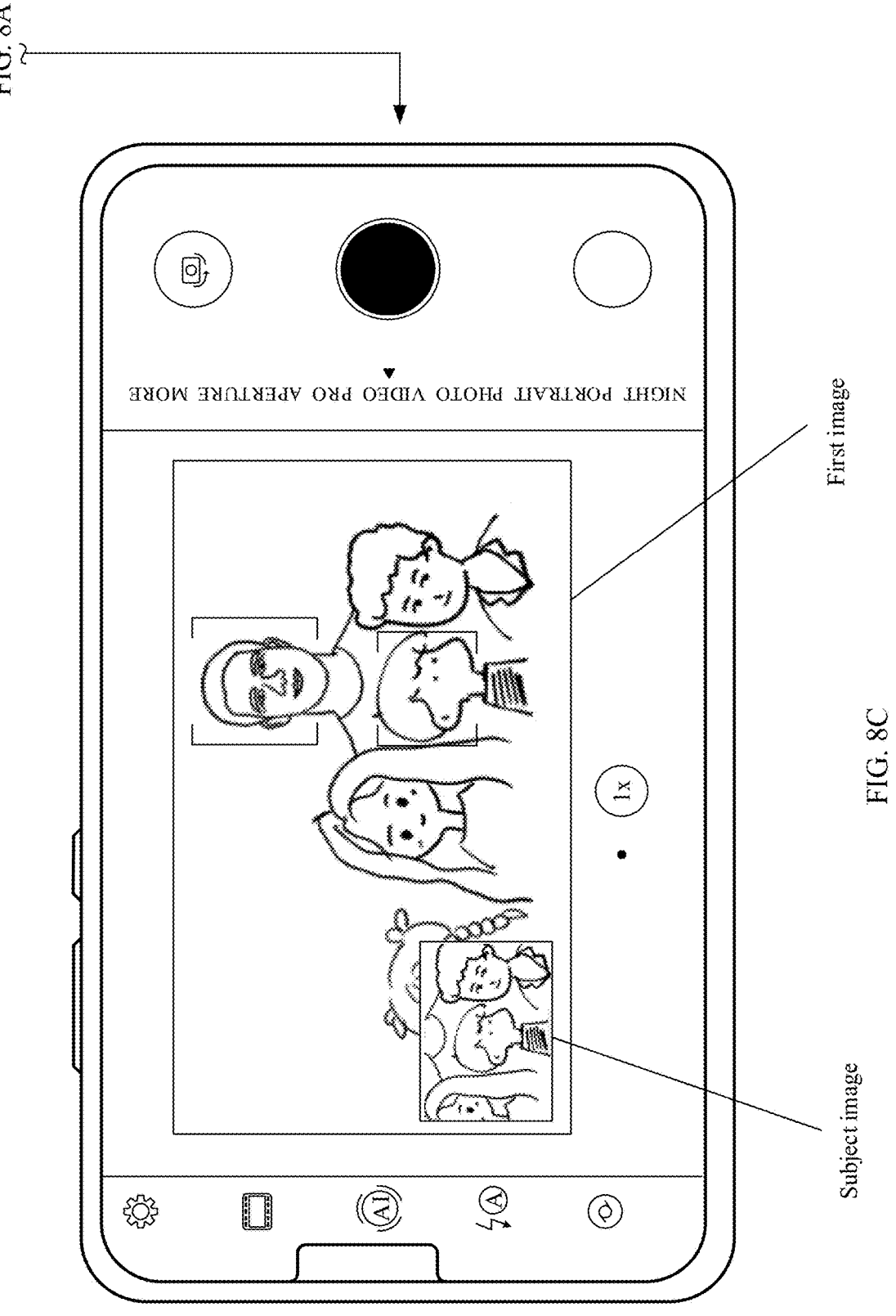

For example, as shown in FIG. 8A to FIG. 8C, the first image includes a plurality of persons, who are an elder sister, the father, the younger brother, an elder brother, and a younger sister from left to right. A pair of brackets is displayed in each of head areas of the father and the younger brother on the second interface. When a finger (or a stylus, which is the same below) touches an area in which the brackets are located, a subject image in which a person in the area is a shot subject may be displayed on the second interface. For example, the finger touches a bracketed area at the head of the father, and the second interface displays a subject image in which the father is located in the middle of the image. When the finger touches a bracketed area at the head of the younger brother, the second interface displays a subject image in which the younger brother is located in the middle of the image.

In a second application scenario, there is one subject image, and the subject image displays shot subjects corresponding to at least two subject boxes selected by the user. In this scenario, when the user selects the bracketed area at the head of the father and the bracketed area at the head of the younger brother, the second interface displays a subject image including the father and the younger brother, and a position of the father or the younger brother in the subject image remains at the target position for being highlighted.

A method for selecting a plurality of subject boxes by the user includes: touching different subject boxes by using a plurality of fingers, or touching and holding one of the subject boxes and sliding to another subject box on the display.

Figure 9A:
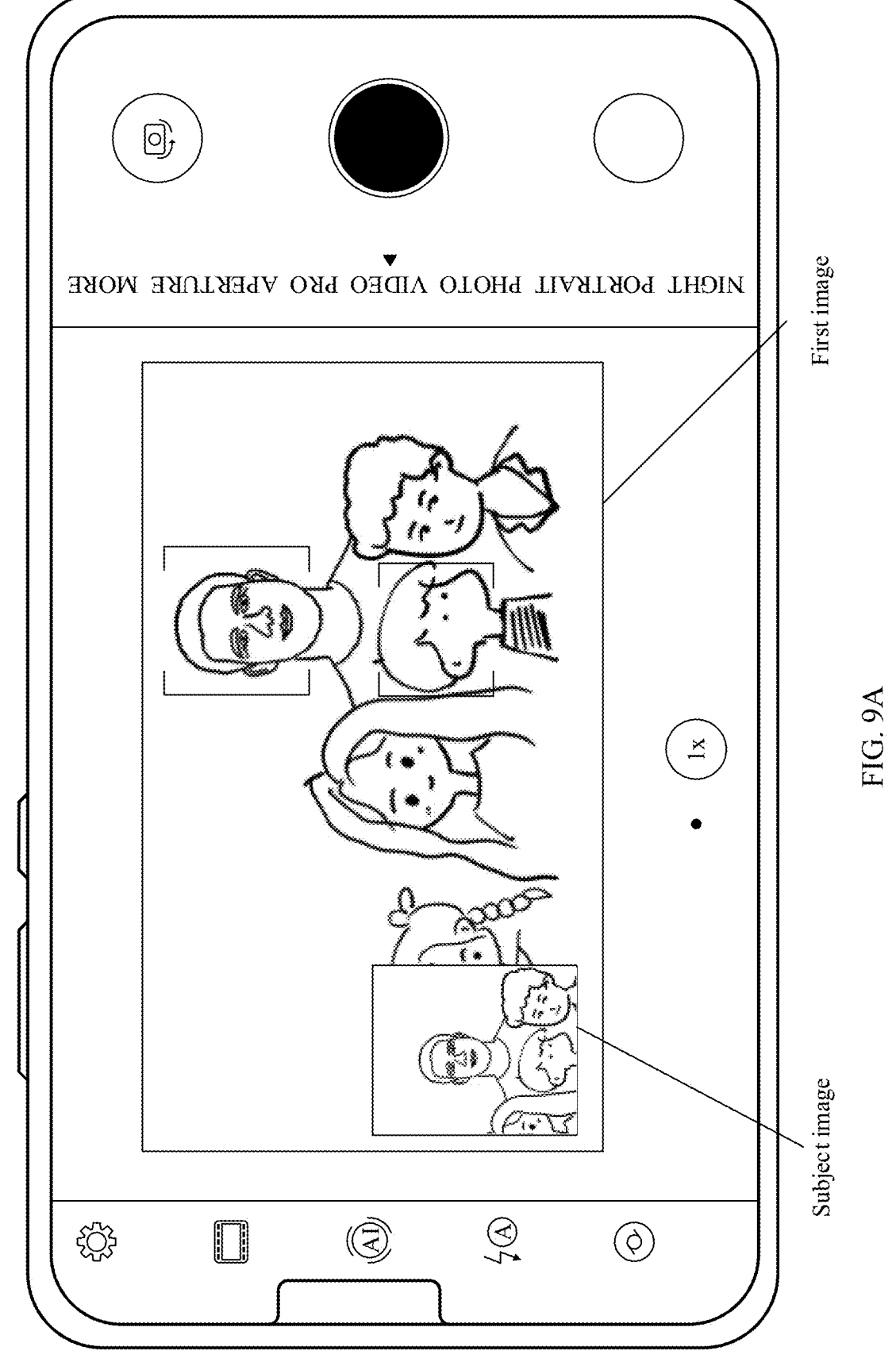
FIG. 9A to FIG. 9C are a schematic diagram of a subject image in a second application scenario according to an embodiment of this application.
Figure 9B:
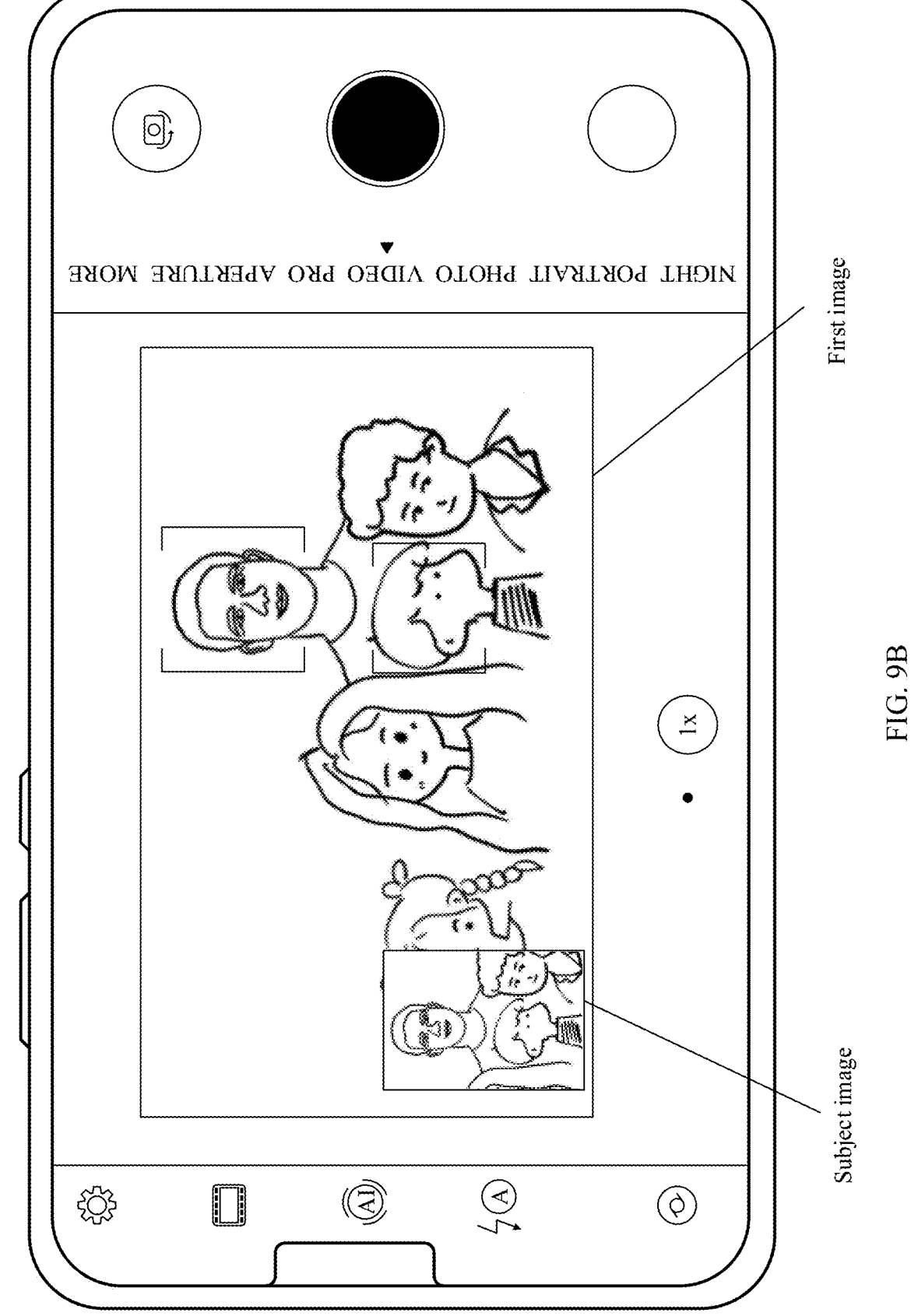
Figure 9C:
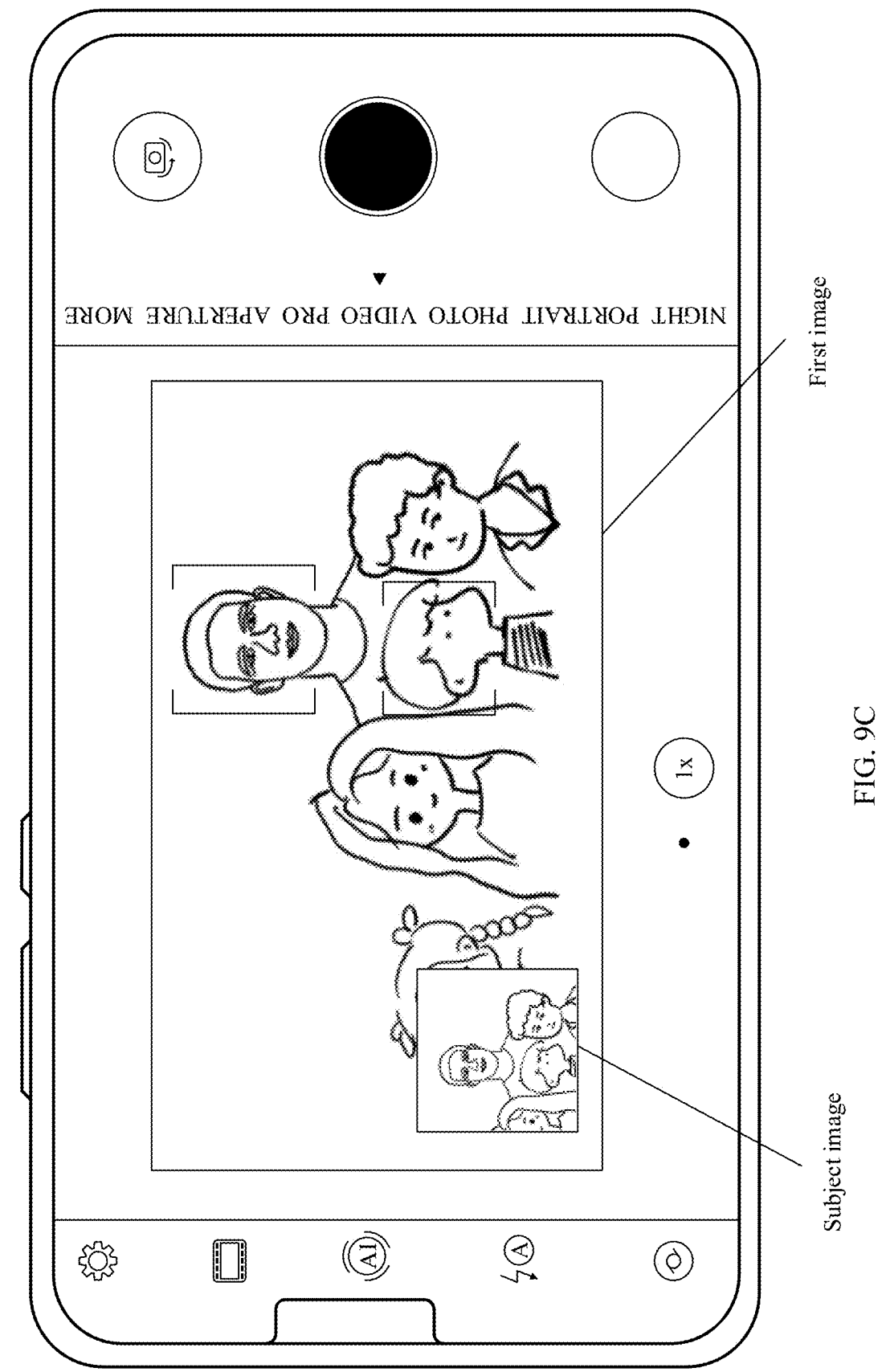

For example, when two fingers of the user contact the bracketed area at the head of the father and the bracketed area at the head of the younger brother, the second interface displays the subject image including the father and the younger brother. A position of the father or the younger brother in the subject image is located at a middle position of the image. As shown in FIG. 9A, the father is located at the target position (the middle position of the image). Alternatively, an area between the father and the younger brother in the subject image is located in the middle position of the image, as shown in FIG. 9B. Alternatively, the father is located at the middle position of the image in the subject image, and the younger brother is located at a position of a golden section ratio of the subject image, as shown in FIG. 9C.

In a third application scenario, there are a plurality of subject images, and each subject image displays a shot subject corresponding to one subject box selected by the user.

Figure 10:
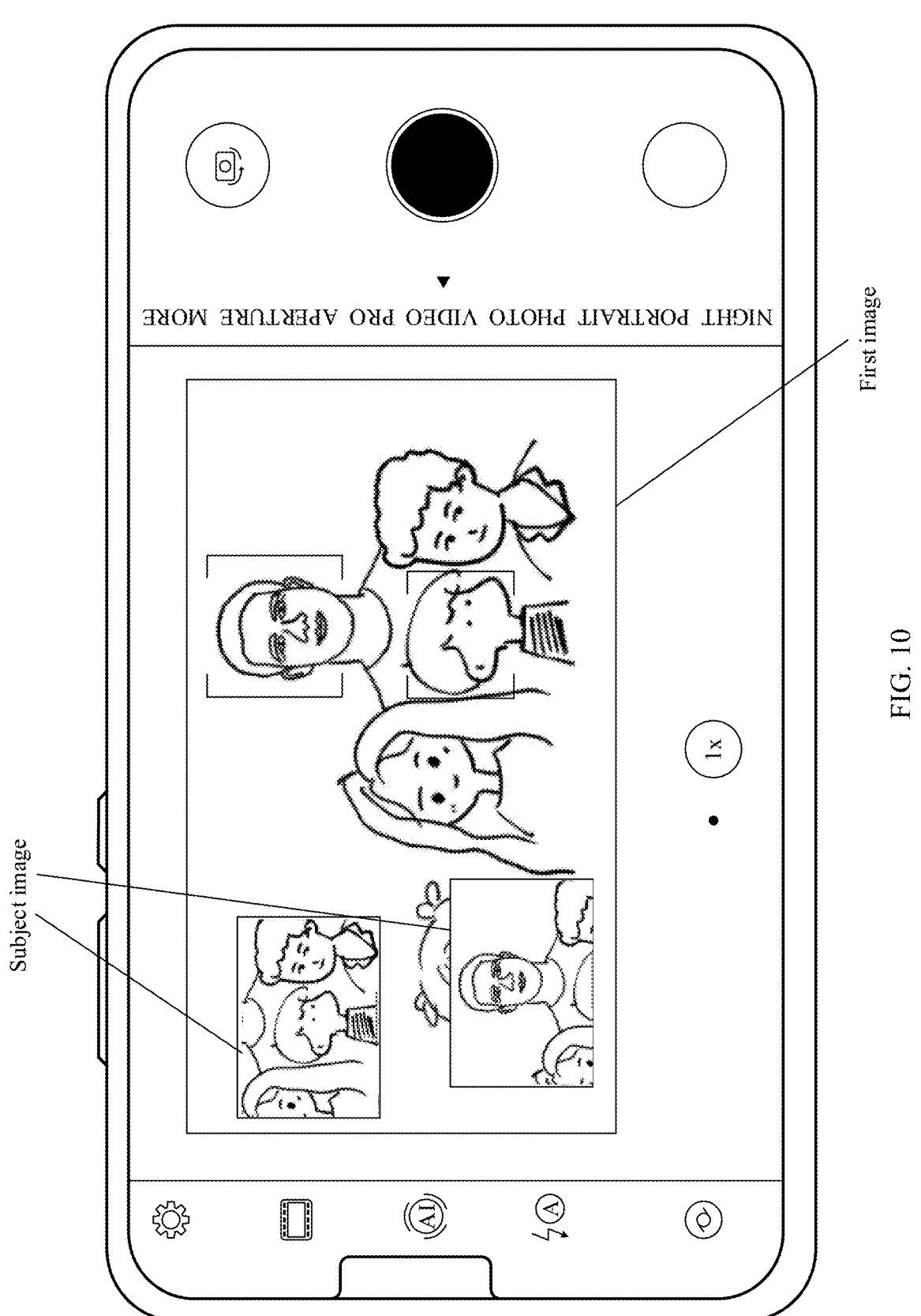
FIG. 10 is a schematic diagram of a subject image in a third application scenario according to an embodiment of this application.

For example, as shown in FIG. 10, when the user selects the bracketed area at the head of the father and the bracketed area at the head of the younger brother, a subject image of the father is displayed in one subject image, and a subject image of the younger brother is displayed in the other subject image. In addition, the father and the younger brother are respectively at target positions of the subject images corresponding to the father and the younger brother (in FIG. 10, the target positions are respectively positions of the father and the younger brother in the middle of the images).

In a fourth application scenario, there are a plurality of subject images, and at least one subject image includes a plurality of subject boxes.

Figure 11:
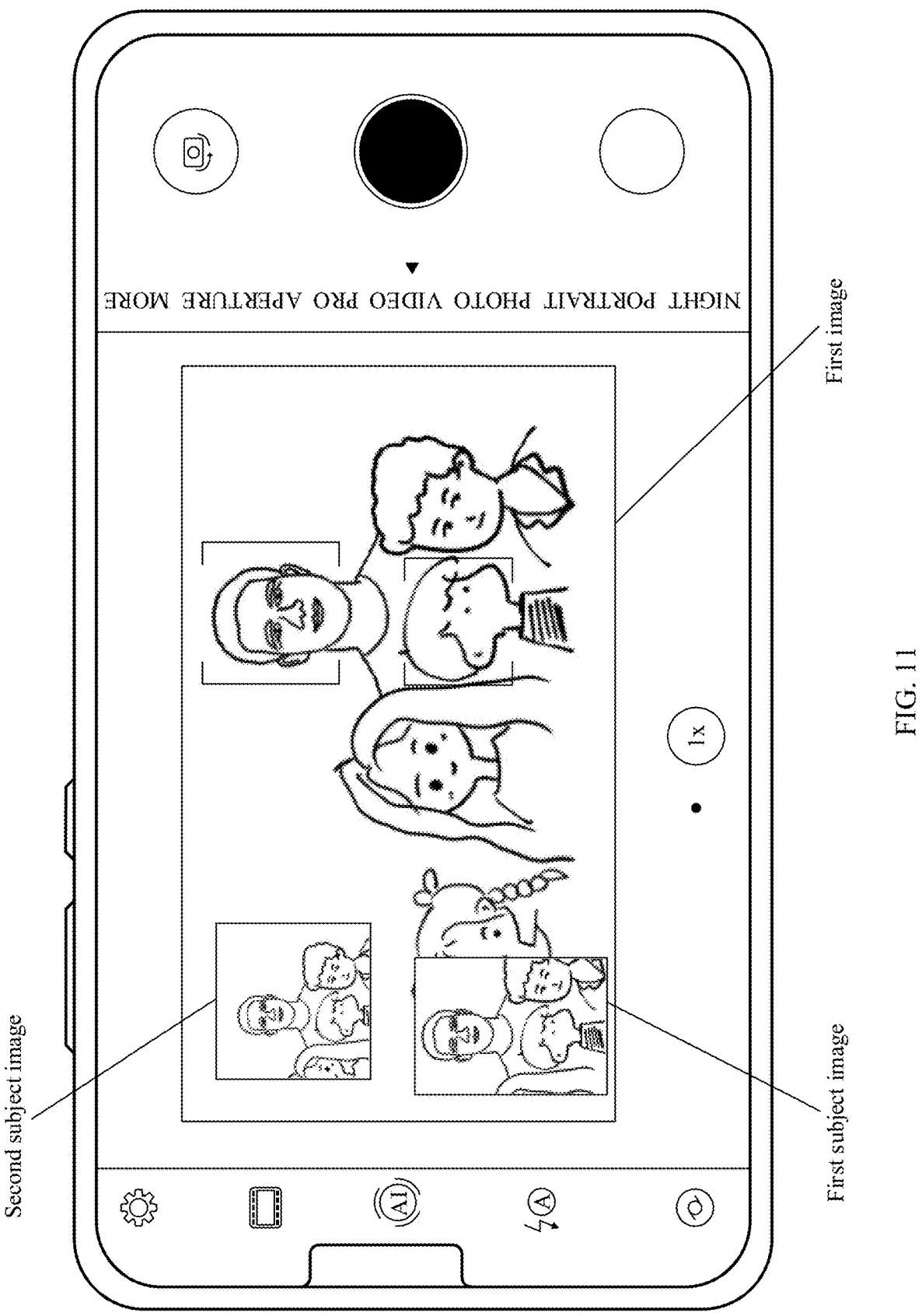
FIG. 11 is a schematic diagram of a subject image in a fourth application scenario according to an embodiment of this application.

In this scenario, in some embodiments, each subject image displays a same shot subject. A difference between images displayed in two subject images may be that positions of the shot subject are different. As shown in FIG. 11, there are two subject images, and the two subject images display images of the father and the younger brother. In a first subject image, the father is located at a middle position of the image, and the younger brother is located at a position of a golden section ratio of the image. In a second subject image, an area between the father and the younger brother is located in the middle of the image. Positions of the shot subject displayed in different subject images are different, which can provide the user with more shooting composition choices, thereby improving shooting experience of the user.

Figure 12:
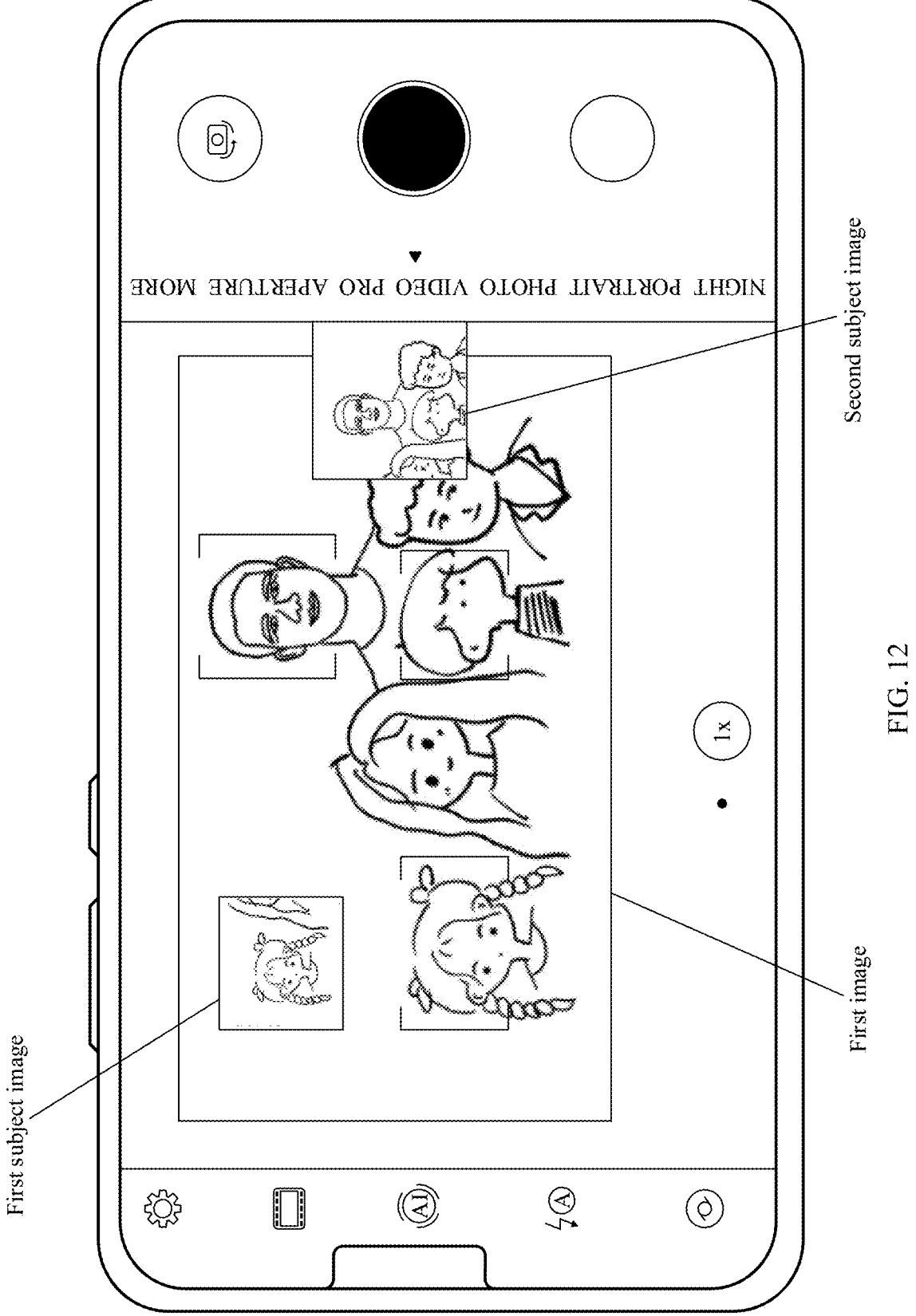
FIG. 12 is another schematic diagram of a subject image in a fourth application scenario according to an embodiment of this application.

In some other embodiments in this scenario, each subject image displays a different shot subject. As shown in FIG. 12, there are two subject images, a first subject image displays an image of the younger sister, and a second subject image displays an image of the father and the younger brother. That is, in this embodiment, three shot subjects of the younger sister, the father, and the younger brother may be simultaneously highlighted, so that the three shot subjects are stably and fluently displayed and highlighted on the screen while both video image stabilization and smoothing are considered.

In some embodiments, the foregoing S309 and S311 may be replaced with S5 and S6.

S5: The mobile phone determines, based on the second position information, whether a position of the shot subject in the current frame of first image relative to a position in the previous frame is still, and if determining that the position of the shot subject is not still, the mobile phone performs smoothing processing on the position in the current frame based on the historical position information, to obtain fourth position information of the shot subject in the first image.

S6: The mobile phone crops a subject image corresponding to the target shot subject in the first image based on the fourth position information, and displays the subject image on the second interface, where the shot subject is located at a target position in the subject image.

Different from the third position information obtained in the foregoing S309 and S311, the fourth position information obtained in this embodiment is the position of the shot subject in the first image on which no image stabilization processing is performed. That is, the mobile phone crops the shot subject obtained after smoothing processing from the first image obtained before image stabilization processing, to obtain the subject image. In this embodiment, position tracking and position smoothing processing are performed on the shot subject, but image jitter interference caused by jitter of the mobile phone is not eliminated. In this case, that the shot subject is located in the middle of the video is basically implemented in a presented subject image. In addition, in comparison with S309 and S311, the subject image is more real, and diversified shooting requirements of the user can be met.

In some embodiments, similar to a processed image displayed on the second interface in the video recording process, in a shooting preview process, a shooting preview interface, namely, the first interface, may also display an image processed by the mobile phone. For example, after entering the first interface, the mobile phone starts to perform S305-306, to obtain the first image and the first output image. The mobile phone may display the first output image on the first interface. Alternatively, the mobile phone may display the first image on the first interface. For the first image (also referred to as a live image), displaying the live image can make the picture more real and natural, and can reflect an actual shooting environment to some extent. For example, when the user shoots a passing pedestrian outdoors in windy and snowy weather, reserving a jitter effect of a picture can make a video viewer immersed in the scene. In addition, the mobile phone displays, on the first interface, the first output image on which image stabilization processing is performed, so that a presented picture is always clear and stable. In this way, selectively displaying the first image or the first output image on the first interface can meet diversified shooting requirements of the user, thereby improving shooting experience of the user.

In some other embodiments, in a shooting preview state, similar to the video recording process, the target shot subject may also be determined and switched, the subject image corresponding to the target shot subject may also be displayed on the first interface, and the target shot subject in the subject image is located at the optimal visual position, to highlight the target shot subject and the shot content, improving a visual expression effect of the picture.

In some other embodiments, in the shooting preview process, the first interface may display the raw image collected by the camera before the user performs the second operation.

In some other embodiments, in the shooting preview process, in addition to displaying the raw image, the first image, or the first output image, the first interface may further display a tracking box. The tracking box may display the raw image or the first image, or does not display any image.

In some embodiments, the mobile phone may display a viewfinder frame on the first interface, and display the viewfinder frame and the tracking frame on the second interface. If the mobile phone obtains the first image, the first output image, and the subject image through processing, any one of the raw image, the first image, and the first output image is displayed in the viewfinder frame, and the subject image is displayed in the tracking box. If the mobile phone does not obtain the first image, the first output image, or the subject image through processing, the viewfinder frame and the tracking box may display the raw image or do not display any image.

S312: The mobile phone detects a third operation performed by the user on the second interface, where the third operation is used to indicate to end video shooting.

For the third operation, refer to descriptions of the first operation in S301. Details are not described herein again. After the user gives an indication of the third operation in the foregoing manner, the mobile phone detects the second operation, and performs S313.

S313: The mobile phone produces recorded N frames of subject images as a video file in response to the third operation.

The N frames are a quantity of subject images obtained by the mobile phone from responding to the second operation to responding to the third operation. The mobile phone may save the video file in a gallery.

In some embodiments, in response to the third operation, the mobile phone produces, as a video file, the recorded N frames of subject images and the recorded N frames of first images displayed on the second interface.

In some embodiments, in response to the third operation, the mobile phone produces, as a video file, the recorded N frames of subject images and recorded N frames of first output images displayed on the second interface.

In this way, the subject image included in a video frame image in the video file is an image of the target shot subject in which both image stabilization and smoothing are considered and that is located at the target position. Therefore, the target shot subject can always remain at the optimal visual position in the video frame image in the video file, to highlight the target shot subject and the shot content. In addition, the interference caused by the camera jitter can be reduced, and picture transition between a subject image and a video frame image that are adjacent is more stable. The center point of the shot subject can be further smoothed, so that a degree of deviation of the shot subject in the subject image is small, ghosting is not prone to occur on the subject image and the video frame image, and the background is clearer.

In some embodiments, in response to the third operation, the mobile phone produces, as a video file, the recorded N frames of first images or the recorded N frames of first output images displayed on the second interface.

In this embodiment, the subject image is displayed in the recording process of the mobile phone, but the video file obtained after the mobile phone ends recording does not include the subject image. In this case, the subject image is used for highlighting in the recording process.

Figure 13:
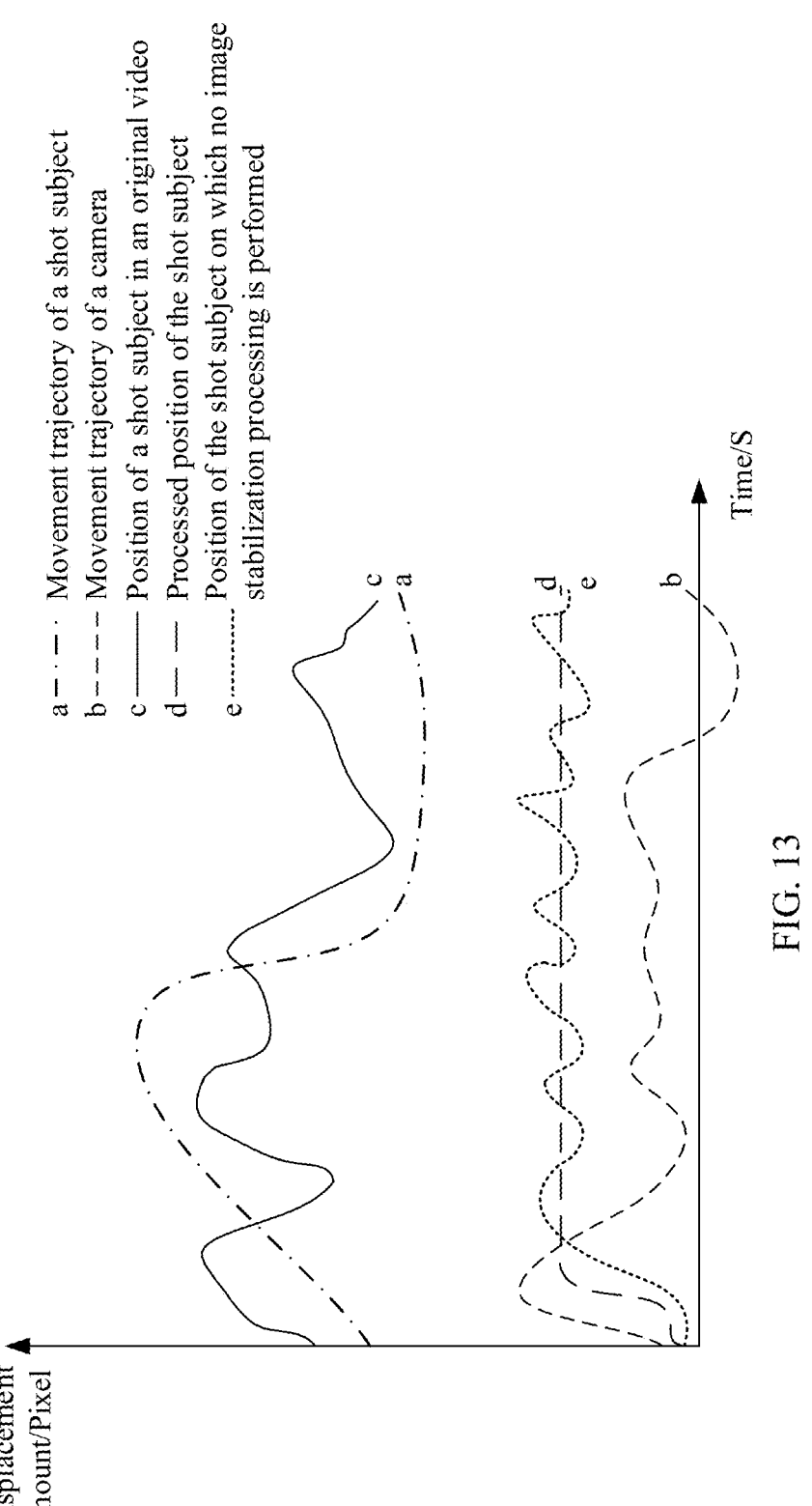
FIG. 13 is a schematic diagram of a line of a position change of a shot subject over time according to an embodiment of this application.

The following describes an effect implemented in an embodiment of this application with reference to FIG. 13. In FIG. 13, a horizontal axis indicates time, and a vertical axis indicates a position displacement amount of the shot subject. In the shooting process, the position of the shot subject moves with time, and a movement trajectory of the shot subject is shown in a curve a in FIG. 13. In addition, the camera jitters during shooting, and a jitter trajectory of the camera is shown in a curve b in FIG. 13. Therefore, in a recorded video that is unprocessed, the position displacement amount of the shot subject is not only affected by movement of the subject, but also affected by movement of the camera, which is indicated by a curve c in FIG. 13. After subject tracking, image stabilization processing for the subject position and smoothing processing are performed on the recorded video, a moving image of the shot subject always remains at the optimal visual position, as shown in a curve d in FIG. 13. In addition, after performing subject detection processing, the mobile phone first performs smoothing processing on the first position information, and then performs image stabilization processing. An obtained subject image fluctuates around the target position and cannot maintain at the target position. A position offset of the shot subject is indicated by a curve e in FIG. 13.

In conclusion, the embodiments of this application provide the shooting method. When the mobile phone is used to shoot a video, the mobile phone determines the target shot subject from the shot subject. The mobile phone always displays the target shot subject at the optimal visual position in the picture in a manner of tracking the target shot subject and performing image stabilization and smoothing processing on the target shot subject. In this way, not only the target shot subject can be kept at the target position for being highlighted in the video shooting process, the interference caused by the camera jitter is reduced, and a picture stabilization effect is achieved, but also the center point of the shot subject can be smoothed. Therefore, in a moving process of the target shot subject, smoothness of a background change of the target shot subject in the subject image is greater than smoothness of a background change of the target shot subject in the preview image, ghosting is not prone to occur on the subject image, and the background is clearer. In the video file produced by using the video frame images including the N frames of subject images, the target shot subject and the shot content can be highlighted. In addition, the interference caused by the camera jitter can be reduced, and the picture transition between the subject image and the video frame image that are adjacent is more stable. The center point of the shot subject can be further smoothed, so that the degree of the deviation of the shot subject in the subject image is small, ghosting is not prone to occur on the subject image and the video frame image, and the background is clearer. Therefore, a presentation effect of the shot video file is better. In addition, when the user does not adjust, in real time based on the position of the shot subject, the video picture displayed on the interface, the shot subject can be kept at the target position, thereby reducing a shooting difficulty and improving shooting experience of the user. In addition, for the user, shooting functions are increased, and are more convenient to use. Even for a common user who has no knowledge about shooting, art, or the like, the shot subject that is expected to highlight in the shot video can be located in the middle of the picture or at the position of the golden section ratio of the picture. The shot video displayed on the second interface can better help a person focus on the shot subject.

Figure 14:
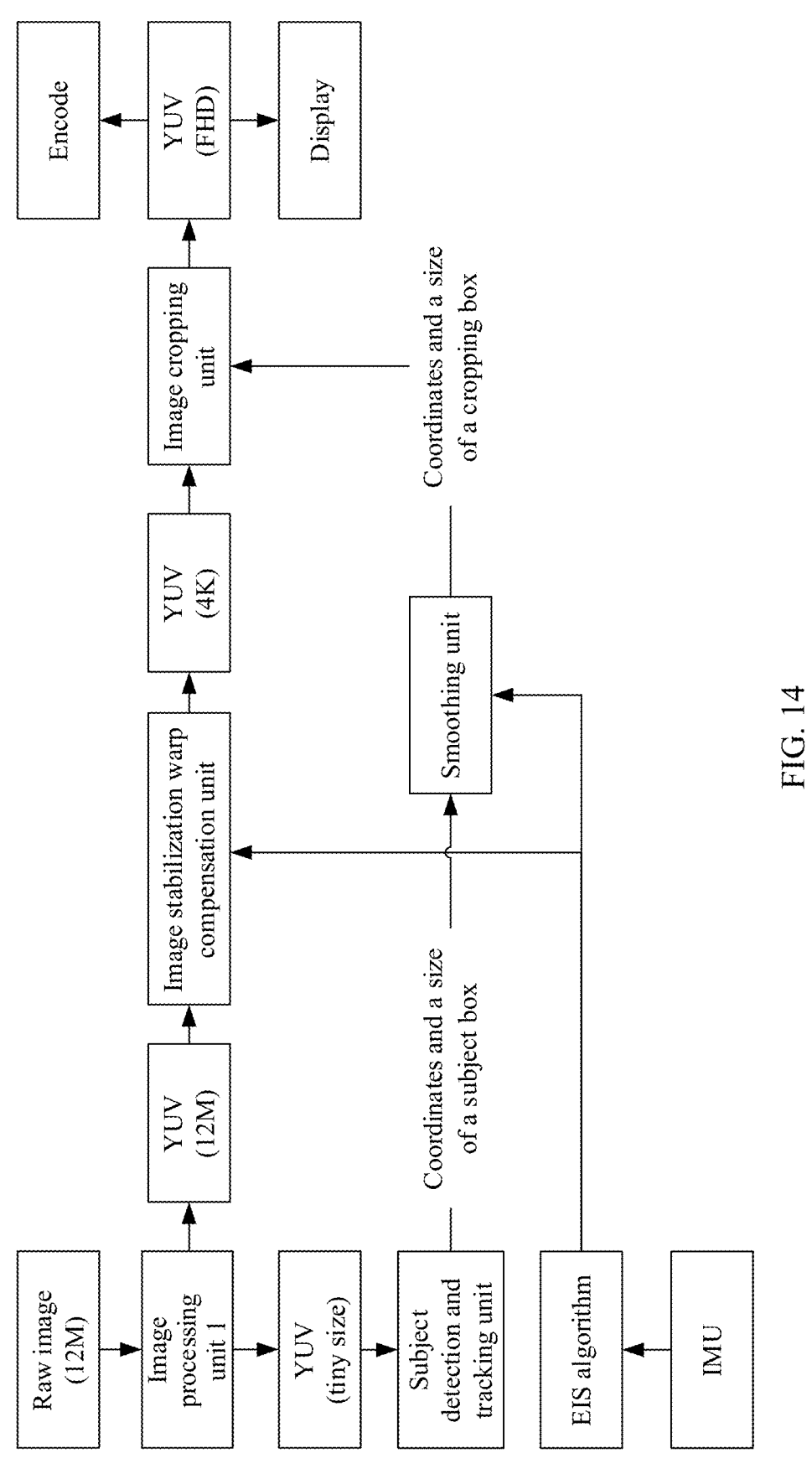
FIG. 14 is a schematic diagram of a first shooting device according to an embodiment of this application.

In addition, an embodiment of this application further provides a first shooting device. As shown in FIG. 14, the shooting device includes an inertial measurement unit (Inertial Measurement Unit, IMU), a subject detection and tracking unit, a smoothing unit, a first image processing unit, an EIS warp unit, an image cropping unit, and the like. The shooting device performs the following steps, to implement the shooting method provided in the foregoing embodiments.

S1401: The IMU detects a camera jitter amplitude to obtain a warp map, and inputs the warp map into the image stabilization warp compensation unit and the smoothing unit, where the warp map stores a coordinate offset of a grid position in an adjacent frame of first image (the coordinate offset is equivalent to the relative pixel displacement in the foregoing S2).

S1402: The mobile phone obtains a raw image (12 M) whose size is 12 megapixels mega (12 M), and processes, by using the first image processing unit, the raw image into a YUV (12 M) image with an unchanged size and a YUV (YUV (tiny)) image with a tiny size, where the YUV (12 M) image is equivalent to the first image in the foregoing S305, and the YUV (tiny) image is equivalent to the second image in the foregoing S305.

S1403: The mobile phone inputs the YUV (12 M) image into the image stabilization warp compensation (EIS warp) unit; and the unit inputs coordinates of a subject box into the warp map for interpolating, to obtain coordinates of the subject box on which jitter displacement compensation is performed, where the coordinates of the subject box are subject coordinates of a shot subject mapped to an image obtained after image stabilizing (the subject coordinates are equivalent to the second position information obtained after the jitter displacement compensation in the foregoing S308), and outputs a 4K YUV (4K) image with a pixel resolution of 4096*2160 to the image cropping unit.

S1404: The mobile phone then inputs the YUV (tiny) image into the subject detection and tracking unit to identify the coordinates and a size of the subject box, inputs the coordinates and the size of the subject box into the smoothing unit, to obtain coordinates and a size of a cropping box after coordinates of the shot subject are smoothed (the coordinates and the size of the cropping box are the third position information in the foregoing S309), and inputs the coordinates and the size of the cropping box into the image cropping unit.

S1405: The image cropping unit finally crops a YUV (high definition, FHD) image (where the YUV (full high definition, Full High Definition, FHD) image is the subject image in the foregoing S311) on the YUV (4K) image based on the coordinates and the size of the cropping box, and encodes (Video encoder) and displays (display) the YUV (FHD) image.

In the foregoing solutions described in S1401-S1405, the shooting device performs subject detection and tracking on the first image, performs camera image stabilization supplementation, and performs smoothing processing on a subject position, so that a moving image of the shot subject always remains at an optimal visual position. The subject detection and tracking unit works in parallel with the image stabilization warp compensation unit, so that pressures power consumption of performance of the mobile phone are low and a processing speed is fast.

Figure 15:
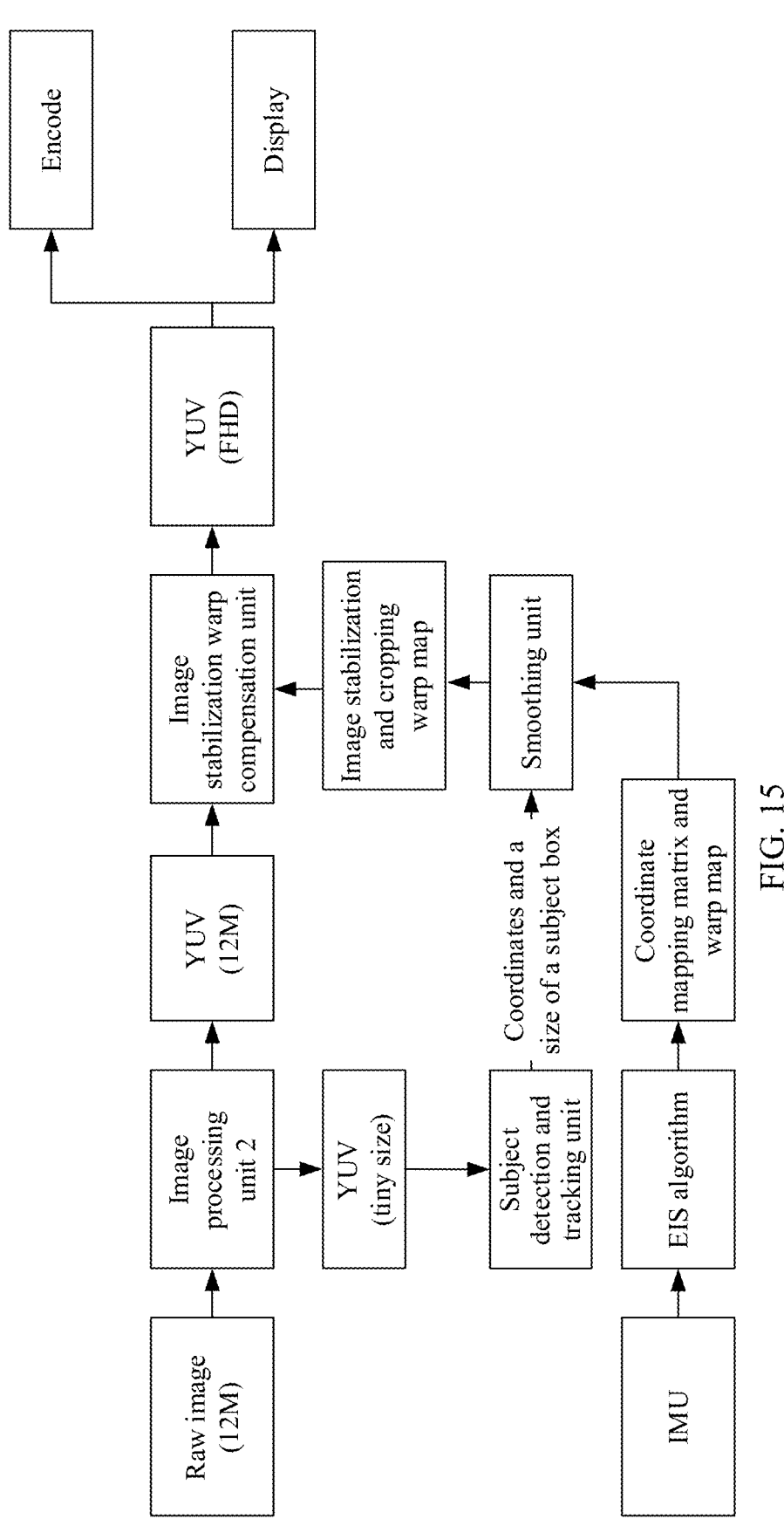
FIG. 15 is a schematic diagram of a second shooting device according to an embodiment of this application.

An embodiment of this application further provides a second shooting device. As shown in FIG. 15, the shooting device includes an inertial measurement unit (Inertial Measurement Unit, IMU), a subject detection and tracking unit, a smoothing unit, a second image processing unit, an image stabilization cropping warp map unit, and an image stabilization warp compensation unit.

Different from a shooting system in the foregoing embodiment, in this design manner, after performing the foregoing S1402, the mobile phone performs S1413-S1415, to implement the shooting method provided in the foregoing embodiments.

S1413: The mobile phone inputs the YUV (tiny) image into the subject detection and tracking unit to identify coordinates and a size of a subject box, inputs the coordinates and the size of the subject box into the smoothing unit, to obtain coordinates and a size of a cropping box after coordinate smoothing is performed on the shot subject (the coordinates and the size of the cropping box are the third position information in the foregoing S309), and inputs the coordinates and the size of the cropping box into the image stabilization cropping warp map unit.

S1414: In the image stabilization cropping warp map unit, input the coordinates and the size of the cropping box into the warp map for interpolating, to obtain a coordinate position that is in the YUV (tiny) image and that is of the shot subject in which both image stabilization and smoothing are considered, so that the coordinate position has both cropping and offset functions, to obtain a new warp map, and input the new warp map into the EIS warp.

S1415: The EIS warp crops a YUV (12 M) image based on the new warp map (cropping processing is equivalent to the foregoing S2) to obtain a YUV (FHD) image (the YUV (FHD) image is the subject image in the foregoing S311), and encodes and displays the YUV (FHD) image.

In the foregoing solutions described in S1401-S1402 and S1413-S1415, the image stabilization cropping warp map unit directly outputs a coordinate offset of the image in which both smoothing and image stabilization are considered, so that the EIS warp can obtain the YUV (FHD) image (which is equivalent to the subject image in the foregoing S311) only through cropping once. In comparison with the previous embodiment, a cropping step during image stabilization processing is omitted, and therefore a processing speed is increased.

Figure 16:
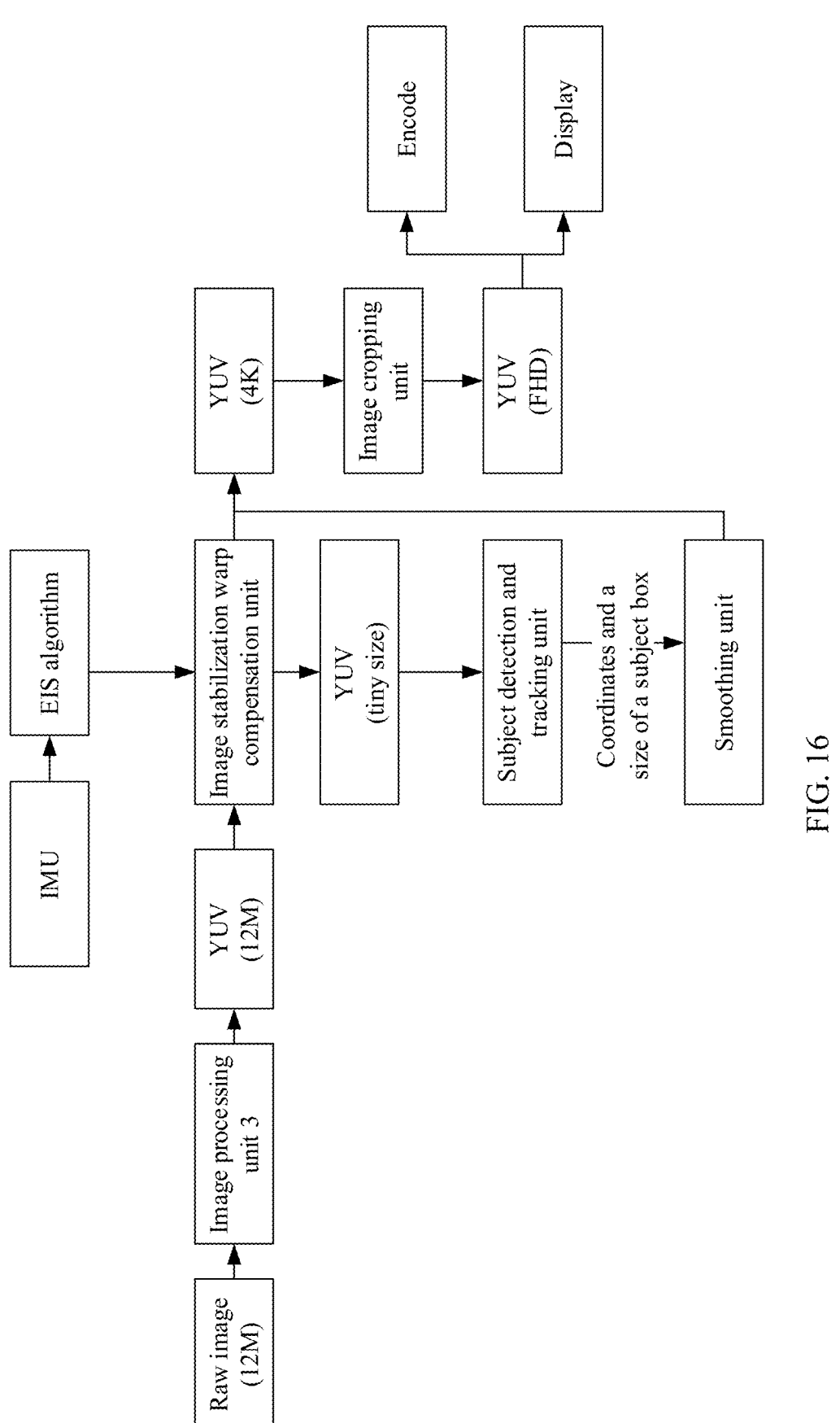
FIG. 16 is a schematic diagram of a third shooting device according to an embodiment of this application.

An embodiment of this application further provides a third shooting device. As shown in FIG. 16, the shooting device includes an inertial measurement unit (Inertial Measurement Unit, IMU), a subject detection and tracking unit, a smoothing unit, a first image processing unit, an image stabilization warp compensation unit, and an image cropping unit.

Different from the foregoing embodiment, in this design manner, after performing the foregoing S1402, the mobile phone performs S1423-S1425, to implement the shooting method provided in the foregoing embodiments.

S1423: The mobile phone inputs the YUV (12 M) image into the image stabilization warp compensation (EIS warp) unit to obtain a first output image of the YUV (12 M) image on which image stabilization warp compensation is performed, downsamples the first output image to obtain a YUV image with a tiny size (a YUV tiny image), inputs the YUV tiny image into the subject detection and tracking unit to obtain coordinates and a size of a subject box, and inputs the coordinates and the size of the subject box into the smoothing unit.

S1424: The smoothing unit then performs smoothing processing on the coordinates and the size of the subject box to obtain a size of a cropping box.

S1425: The image cropping unit crops a YUV (4K) image based on the size of the cropping box, and outputs a YUV (FHD) image.

In the solutions described in the foregoing S1401-S1402 and S1423-S1425, the shooting device sequentially performs image stabilization warp compensation processing and subject identification processing on the YUV (12 M) image, so that the two processing processes are sequentially executed. In this way, the shooting device can directly perform subject detection and tracking on the first output image obtained after image stabilization warp compensation. In comparison with the foregoing two embodiments, an interpolation step of mapping the subject coordinates to the first output image is reduced, and therefore a processing speed is increased.

An embodiment of this application provides an electronic device. The electronic device may include a memory and one or more processors. The memory is configured to store computer program code, and the computer program code includes computer instructions. When the processor executes the computer instructions, the electronic device can perform the functions or the steps performed by the mobile phone in the foregoing method embodiments. A structure of the electronic device may refer to the structure of the electronic device 100 in FIG. 1.

An embodiment of this application further provides a computer-readable storage medium. The computer-readable storage medium includes computer instructions. When the computer instructions are run on the electronic device, the electronic device is enabled to perform the functions or the steps performed by the mobile phone in the foregoing method embodiments.

An embodiment of this application further provides a computer program product. When the computer program product runs on a computer, the computer is enabled to perform the functions or the steps performed by the mobile phone in the foregoing method embodiments.

It may be clearly learned by a person skilled in the art from the foregoing descriptions of the implementations that for convenience and brevity of description, only division into the foregoing functional modules is used as an example for description. In actual application, the foregoing functions may be allocated to different functional modules for implementation according to a requirement, that is, an internal structure of an apparatus is divided into different functional modules, to complete all or some of the functions described above.

In the several embodiments provided in this application, it should be understood that the disclosed apparatus and method may be implemented in other manners. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions in embodiments.

In addition, the functional units in the embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, the part contributing to the conventional technology, or all or some of the technical solutions may be implemented in a form of a software product. The software product is stored in a storage medium and includes several instructions for enabling a device (which may be a single-chip microcomputer, a chip, or the like) or a processor (processor) to perform all or some of the steps of the methods described in the embodiments of this application. The storage medium includes various media that can store program code, for example, a USB flash drive, a removable hard disk, a read-only memory (read only memory, ROM), a random access memory (random access memory, RAM), a magnetic disk, or an optical disc.

The foregoing content is merely specific implementations of this application, but is not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A shooting method, applied to an electronic device, wherein the electronic device comprises a camera, the camera is configured to collect a raw image, and the method comprises:

enabling a camera application; and detecting a first position information of a target shot subject from a ith frame of the second image, the ith frame of the second image is obtained through processing based on the ith frame of raw image, wherein i is a positive integer greater than 1;

mapping the first position information of the target shot subject to the ith frame of first output image, to obtain the second position information of the target shot subject in the ith frame of first output image; the ith frame of first output image is obtained through performing jitter displacement compensation processing on the ith frame of raw image;

performing smoothing processing on the second position information of the ith frame of first output image based on second position information of the target shot subject in an (i−1)th frame of first output image, to obtain third position information of the target shot subject; cropping the ith frame of first output image based on the third position information, to obtain the ith frame of subject image corresponding to the target shot subject;

after a video recording operation is detected, displaying the ith frame of preview image on a recording interface and highlighting the ith frame of subject image of a target shot subject, wherein the ith frame of preview image is obtained through processing based on the raw image, the target shot subject is at a target position on the ith frame of subject image, and a viewfinder range of the ith frame of subject image is within a viewfinder range of the preview image.

2. The method according to claim 1, wherein in a moving process of the target shot subject, the target shot subject remains at the target position on the subject image.

3. The method according to claim 1, wherein in the moving process of the target shot subject, smoothness of a background change of the target shot subject in the subject image is greater than smoothness of a background change of the target shot subject in the preview image.

4. The method according to claim 1, wherein there is at least one target shot subject, there is at least one subject image, one target shot subject corresponds to one subject image, or one target shot subject corresponds to a plurality of subject images, and the subject image is located outside an area of the preview image or partially overlaps the area of the preview image.

5. The method according to claim 1, wherein the target shot subject and/or the target position are determined in response to indication operations of a user or are automatically determined by the electronic device, and the method further comprises:

detecting an operation of switching a target shot subject, and displaying a subject image corresponding to a switched-to target shot subject on the recording interface; and/or detecting an operation of switching a target position, and displaying, on the recording interface, the subject image corresponding to the target shot subject located at a switched-to target position.

6. The method according to claim 1, wherein the performing smoothing processing on the second position information of the ith frame of first output image based on second position information of the target shot subject in an (i−1)th frame of first output image, to obtain third position information of the target shot subject comprises:

obtaining a first position difference between the second position information of the target shot subject in the (i−1)th frame of first output image and the second position information of the target shot subject in the ith frame of first output image; and determining, based on the first position difference, to perform smoothing processing on the second position information in the ith frame of first output image based on the second position information of the target shot subject in the (i−1)th frame of first output image, to obtain the third position information of the target shot subject, wherein a second position difference between the third position information and the second position information in the (i−1)th frame of first output image is less than or equal to the first position difference.

7. The method according to claim 6, wherein the way comprises:

performing format processing on the ith frame of raw image to obtain an ith frame of first image, wherein the ith frame of first image is the ith frame of preview image; or performing jitter displacement compensation processing on the ith frame of first image to obtain an ith frame of first output image, wherein the ith frame of first output image is the ith frame of preview image.

8. The method according to claim 7, wherein the performing jitter displacement compensation processing on the ith frame of first image to obtain an ith frame of first output image comprises:

obtaining picture jitter displacement information of the ith frame of first image relative to any one or more frames of first images before the ith frame of first image; and performing jitter displacement compensation processing on a picture in the ith frame of first image based on the picture jitter displacement information, to obtain the ith frame of first output image.

9. The method according to claim 8, wherein the obtaining picture jitter displacement information of the ith frame of first image relative to any one or more frames of first images before the ith frame of first image comprises:

detecting a jitter amplitude of the electronic device; and determining the picture jitter displacement information based on the jitter amplitude, wherein the picture jitter displacement information comprises an offset of each pixel in the ith frame of first image relative to a corresponding pixel in the any one or more frames of first images before the ith frame.

10. The method according to claim 7, wherein the method further comprises:

performing downsampling processing on the ith frame of first image to obtain an ith frame of second image.

11. The method according to claim 1, wherein the cropping of the ith frame of first output image based on the third position information, to obtain the ith frame of subject image corresponding to the target shot subject comprises:

determining a minimum bounding rectangular box of the target shot subject based on the third position information;

determining a cropping area based on the minimum bounding rectangular box, wherein the cropping area comprises the minimum bounding rectangular box; and obtaining an image corresponding to the cropping area in the ith frame of first output image image, to obtain the ith frame of subject image corresponding to the target shot subject.

12. The method according to claim 11, wherein after the obtaining an image corresponding to the cropping area in the ith frame of first output image, the method further comprises:

zooming out or zooming in the image corresponding to the cropping area, to obtain the ith frame of subject image corresponding to the target shot subject and with a preset display specification, wherein the preset display specification is a preset screen-to-body ratio of the electronic device.

13. The method according to claim 1, wherein the target position comprises a middle position or a position of a golden section ratio.

14. The method according to claim 1, wherein the method further comprises:

detecting an end recording operation; and generating the video file, wherein the video file comprises the subject image and/or the preview image.

15. The method according to claim 1, wherein the method further comprises:

displaying a shooting preview interface after the camera application is enabled, wherein the shooting preview interface comprises the preview image, or the shooting preview interface comprises the preview image and the subject image.

16. An electronic device, comprising:

a camera, configured to collect an image;

a screen, configured to display an interface;

one or more processors;

a memory; and one or more computer programs, wherein the one or more computer programs are stored in the memory, the one or more computer programs comprise instructions, and when the instructions are executed by the electronic device, the electronic device is enabled to perform the method according to claim 1.

17. A non-transitory computer-readable storage medium, comprising computer instructions, wherein when the computer instructions are run on an electronic device, the electronic device is enabled to perform the method according to claim 1.

* * * * *